United States Patent [19]
Kubota et al.

[11] Patent Number: 5,754,172
[45] Date of Patent: May 19, 1998

[54] INFORMATION DISPLAY METHOD

[75] Inventors: Ichiro Kubota, Kanagawa; Makoto Niijima, Tokyo, both of Japan

[73] Assignees: Sony Corporation; Asahi Shimbun Publishing Company, both of Tokyo, Japan

[21] Appl. No.: 583,620

[22] Filed: Jan. 5, 1996

[30] Foreign Application Priority Data

Jan. 9, 1995 [JP] Japan ..................... 7-001092
Jan. 10, 1995 [JP] Japan ..................... 7-001602

[51] Int. Cl.$^6$ ..................................... G06T 1/00
[52] U.S. Cl. .................. 345/302; 707/514; 345/329
[58] Field of Search ..................... 395/353, 356, 395/329, 343, 344, 333; 345/302, 353, 356, 329, 343, 344, 333; 348/468; 707/500, 501, 502, 511, 513–515; 379/90.01, 93.01, 93.25, 100.01

[56] References Cited

U.S. PATENT DOCUMENTS

| | | | |
|---|---|---|---|
| 4,071,697 | 1/1978 | Bushnell et al. | 379/88 |
| 4,740,912 | 4/1988 | Whitaker | 395/353 |
| 5,388,196 | 2/1995 | Pajak et al. | 395/329 |
| 5,454,073 | 9/1995 | Fukushima et al. | 395/344 |
| 5,491,785 | 2/1996 | Robson et al. | 395/507 |
| 5,500,929 | 3/1996 | Dickinson | 395/356 |

*Primary Examiner*—Joseph H. Feild
*Attorney, Agent, or Firm*—Frommer Lawrence & Haug LLP; William S. Frommer

[57] ABSTRACT

An information display method of transmitting predetermined information through a transmission path, receiving the transmitted information by a receiving apparatus, recording the information received by the receiving apparatus onto a recording medium, and displaying the information recorded on the recording medium to a display apparatus. Titles of a plurality of information are displayed. Only a predetermined number of predetermined ones of the titles are designated. The designated information is automatically and sequentially displayed. The information is associated with genres and the information is designated every genre. The information is multimedia news articles. In a state in which the designated information is automatically and sequentially reproduced, when it is instructed to display the previous or subsequent information, more detailed information, or titles of the information that is being displayed at present, such information or titles are displayed and, after that, the apparatus is returned to the state in which the designated information is automatically and sequentially displayed.

13 Claims, 22 Drawing Sheets

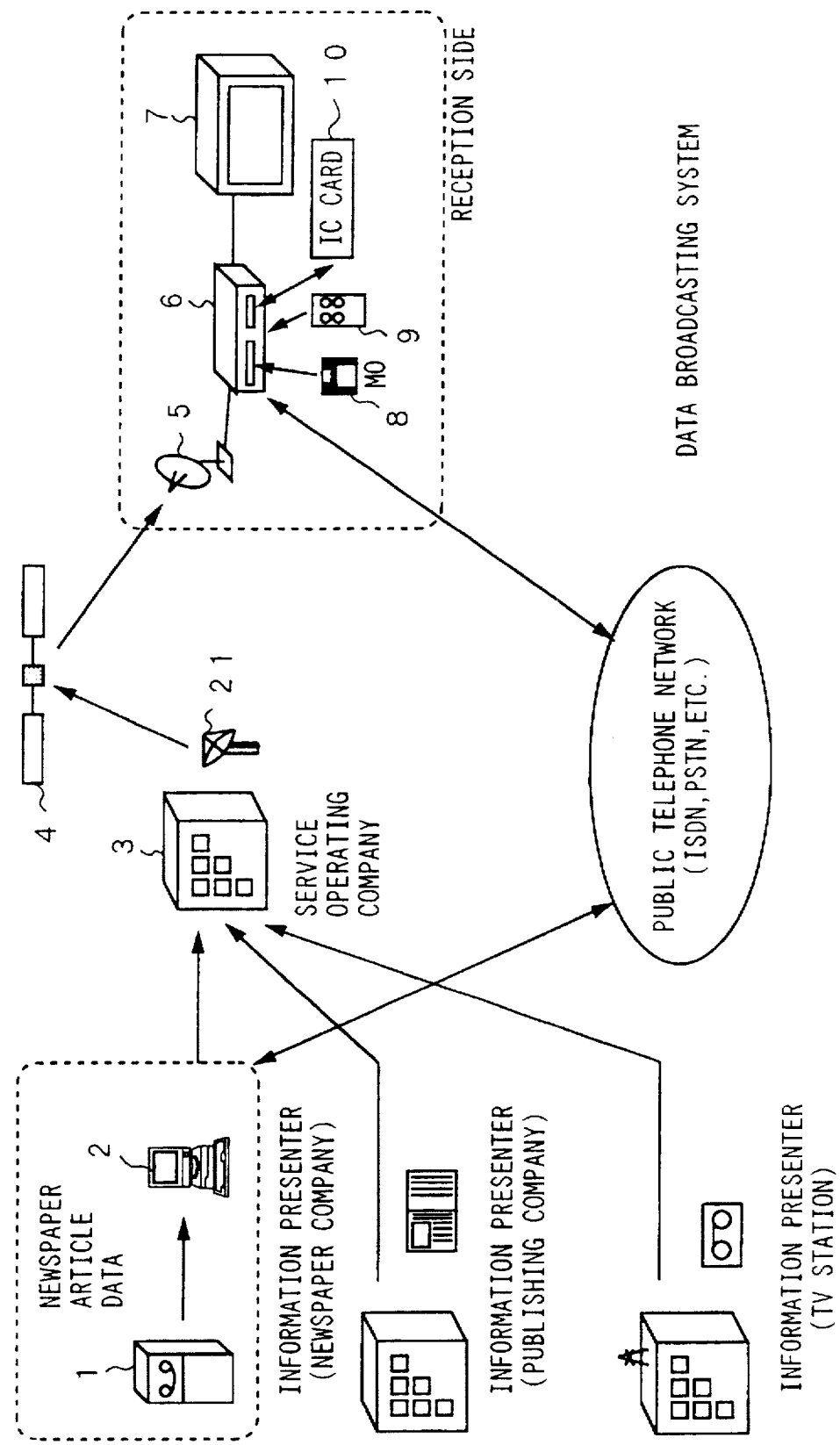

Fig. 2

| ARTICLE ID |
| --- |
| KIND |
| TRANSMISSION DATE AND HOUR |
| SIGNIFICANCE (PI) |
| ARTICLE TITLE |
| THE NUMBER OF TEXT CHARACTERS |
| SUMMARY TEXT |
| PHOTOGRAPH ID |
| PHOTOGRAPH SIZE |
| PHOTOGRAPH LAYOUT INFORMATION |
| POINTER TO PHOTOGRAPH DATA |
| MOTION IMAGE ID |
| MOTION IMAGE SIZE |
| MOTION IMAGE LAYOUT INFORMATION |
| POINTER TO MOTION IMAGE DATA |
| POINTER TO AUDIO READ DATA |
| POINTER TO DETAILED ARTICLE DATA |

ARTICLE DATA FILE FORMAT

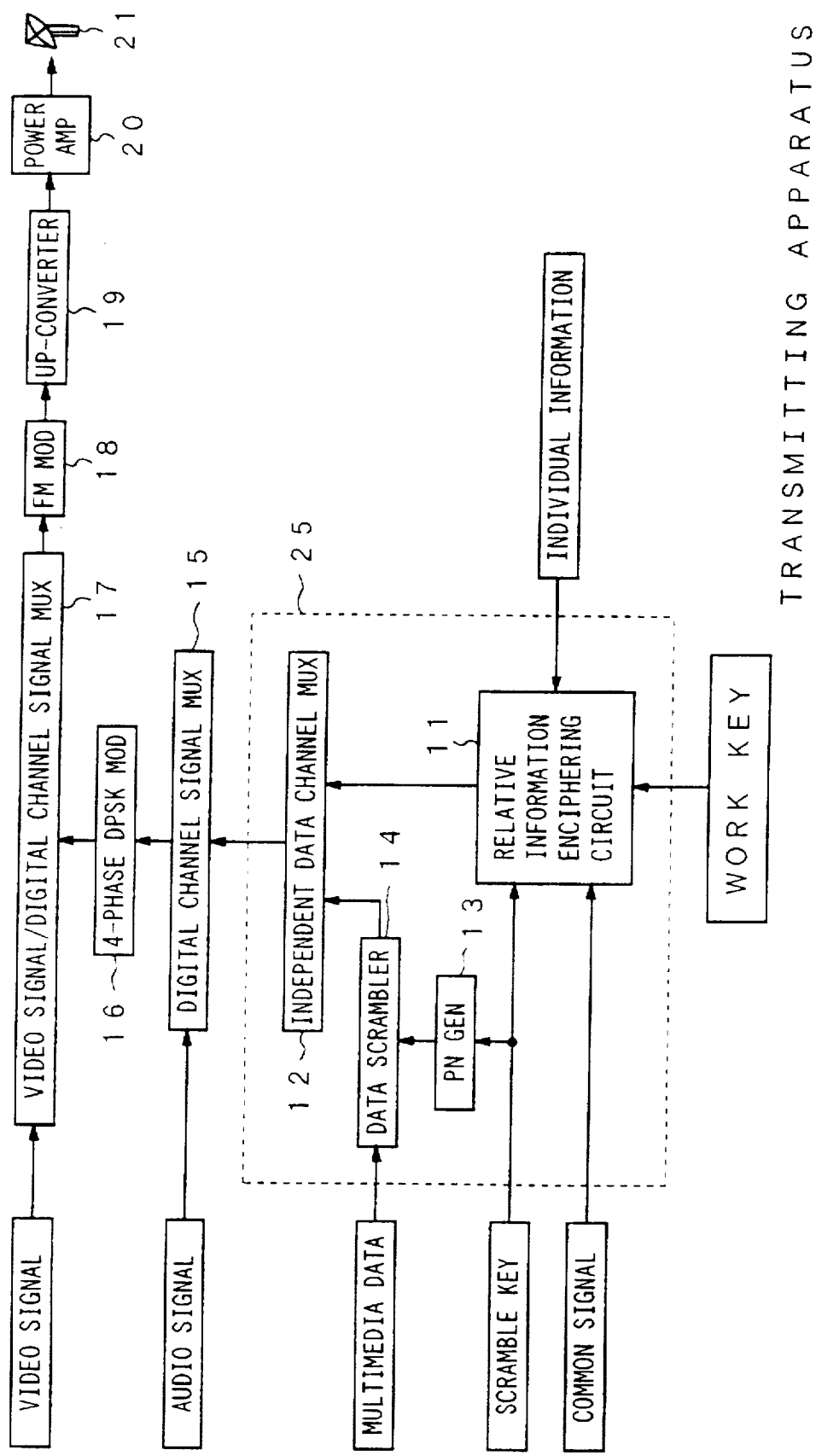

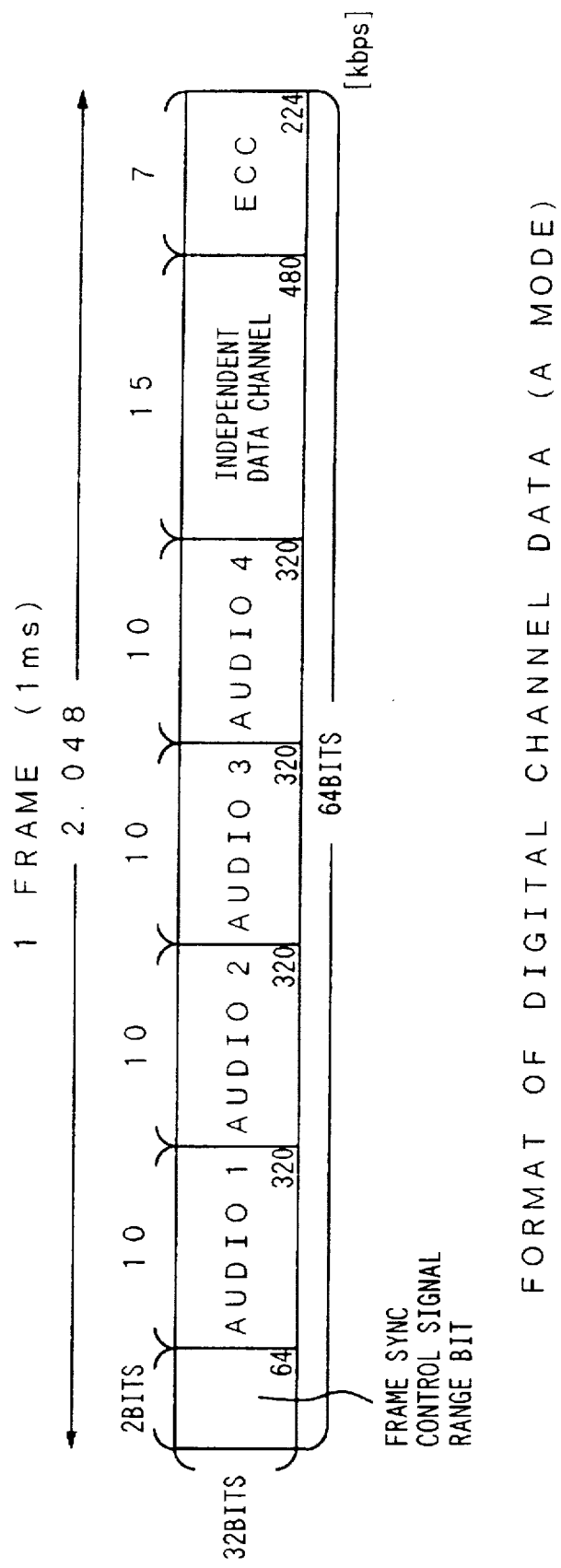

Fig. 9

JUNE 16 (THURS.) 1994 (HEISEI 6)

RECOMMENDED COURSE (GUIDE REPRODUCTION)   5MINUTES   10MINUTES

| TOP | INTEGRATION | EXPLANATION | POLITICS | INTERNATIONAL | ECONOMY | MARKET SITUATION | HOME | RADIO |

| SPORTS | DISTRICT | SOCIETY | TELEVISION | SPECIAL EDITION | WEATHER | NOTICE | READING | OTHERS |

OPTIONAL COURSE (AUTO REPRODUCTION)   5MINUTES   10MINUTES

| TOP | SPORTS | POLITICS | SOCIETY | | | | | |

| | | | | | | | | |

Fig. 11

JUNE 16 (THURS.) | GUIDE REPRODUCTION | AUTO REPRODUCTION

 SOLIBZINE, THREE PERSONS DIED EVEN IN CLINICAL DEMONSTRATION

 GOVERNMENT SOCIETY OF TAX ADMINISTRATION EXAMINATION DECIDED REPORT REGARDING "SUBSTANTIAL INCREASE IN TAX"

 U.S.A. SHOWED DRAFT OF DECIDED RESULT ABOUT SANCTIONS AGAINST NORTH KOREA TO JAPAN AND SOUTH KOREA

 WHOLE IMAGE OF ATOMIC DEVELOPMENT IN NORTH KOREA IS RESEARCHED

 FORMER SECRETARY TESTIFIED MONEY SCANDAL OF EX-PRIME MINISTER HOSOKAWA

SCHEDULE INTRODUCTION

TOUR TO FANTASTIC LADAKH IN THE NORTHERNMOST INDIA

XX TRAVEL CENTER    (03)9999-9999

SCHEDULE INTRODUCTION

ADVT INDEX

TITLE | PREVIOUS ARTICLE | NEXT ARTICLE

Fig. 12

JUNE 16 (THURS.) 1994 (HEISEI 6)

GUIDE REPRODUCTION | AUTO REPRODUCTION

 WHOLE IMAGE OF ATOMIC DEVELOPMENT IN NORTH KOREA IS RESEARCHED

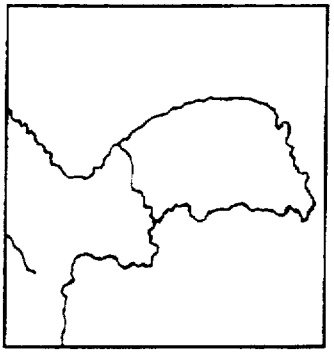

ATOMIC RELATIVE FACILITIES IN KOREAN PENINSULA

REPORTERS OF THE FOREIGN PRESS SECTION AND SCIENCE SECTION RESEARCHED A WHOLE IMAGE OF THE ATOMIC DEVELOPMENT IN NORTH KOREA THROUGH THE OFFICIAL REFERENCES PUBLISHED AND ANALYSES OF THE SPECIALISTS AND THE LIKE OF THE ATOMIC POWER GENERATION.

WHOLE ARTICLE

☐ DATE : JULY 14(THURS.), 1994
       6:30 p.m.～8:00 p.m.
☐ PLACE : XXXXX HALL
☐ CHARGE : S SEAT - 5,000 YEN, A SEAT - 4,000 YEN

XXX ISHII
EVENING WITH CHANSON

VACANT SEAT INFORMATION

ADVT INDEX

EXAMPLE OF ARTICLE PICTURE PLANE (TITLE)  PREVIOUS ARTICLE | NEXT ARTICLE  

*Fig. 14*

| |
|---|
| A D V T    I D |
| A D V T    T I T L E |
| K I N D |
| ADVT MAIN COMPANY NAME |
| POINTER TO ADVT REGION IMAGE DATA |
| COMMNAD NAME 1 (VACANT SEAT INFORMATION) |
| LAYOUT INFORMATION OF COMMAND NAME 1 (VACANT SEAT INFORMATION) |
| POINTER TO PICTURE PLANE DATA FOR COMMAND NAME 1 (VACANT SEAT INFORMATION) |
| COMMNAD NAME 2 (ADVT INDEX) |
| LAYOUT INFORMATION OF COMMAND NAME 2 (ADVT INDEX) |
| POINTER TO PICTURE IMAGE DATA FOR COMMAND NAME 2 (ADVT INDEX) |

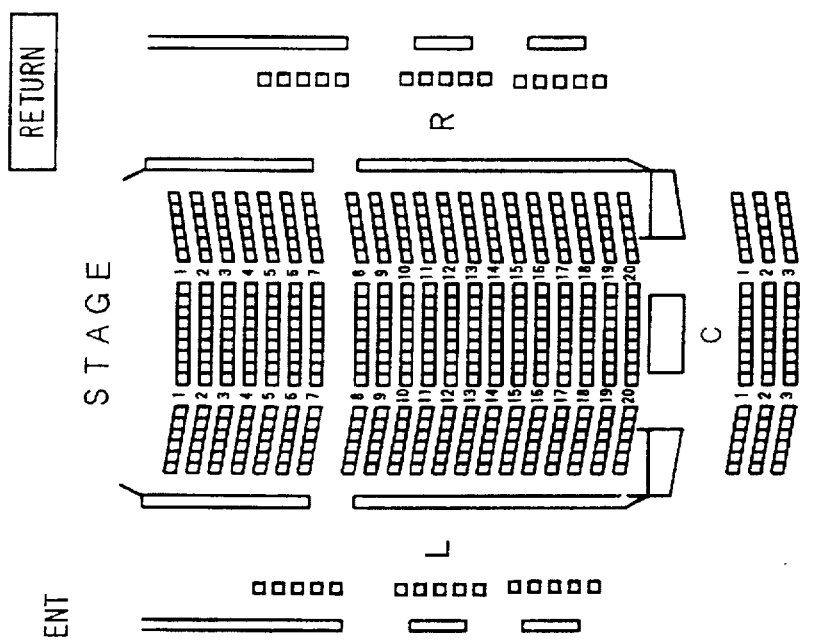

X X X   I S H I I
E V E N I N G   W I T H   C H A N S O N                SEAT ARRANGEMENT

☐ DATE : JULY 14 (THURS.), 1994
     6:30 p.m. ~ 8:00 p.m.
☐ PLACE : XXXXX HALL
     TSUKIJI 1-CHOME, 1-1, CHUO-KU, TOKYO
     TEL. 03-9999-9999

<VACANT SEAT INFORMATION>  (○···VACANT · △···PARTIALLY VACANT · ×···FILLED)

| S SEAT(5,000YEN) | | | A SEAT(4,000YEN) | | |
|---|---|---|---|---|---|
| 1ST FLOOR | 1ROW | △ | 1ST FLOOR | 13ROW | ○ |
| | 2ROW | △ | | 14ROW | ○ |
| | 3ROW | × | | 15ROW | ○ |
| | 4ROW | × | | 16ROW | ○ |
| | 5ROW | × | | 17ROW | ○ |
| | 6ROW | △ | | 18ROW | ○ |
| | 7ROW | ○ | | 19ROW | ○ |
| | 8ROW | ○ | | 20ROW | ○ |
| | 9ROW | ○ | 1ST FLOOR | 21ROW | ○ |
| | 10ROW | ○ | | 22ROW | ○ |
| | 11ROW | ○ | 2ND FLOOR | L Rdf | ○ |
| | 12ROW | ○ | | L ROW | ○ |
| 2ND FLOOR | C 1ROW | × | | | |
| | C 2ROW | △ | | | |
| | C 3ROW | ○ | | | |

EXAMPLE OF VACANT SEAT INFORMATION PICTURE PLANE

Fig. 17

JUNE 16 (THURS.), 1994 (HEISEI 6)

CONCERT/EVENT INFORMATION

ADVT KIND LIST    RETURN

- BB MATSUDA (JUNE 19)
- XX YAMADA (JULY 1)

- WORLD DINOSAURS EXHIBITION (JULY 4 ~)
- XX NEWSPAPER 120TH ANNIVERSARY LECTURE MEETING (SEPT. 10)

EXAMPLE OF ADVERTISEMENT INDEX PICTURE PLANE

Fig. 18

JUNE 16 (THURS.), 1994 (HEISEI 6)

ADVT CLASSIFICATION

- REAL ESTATE/HOUSE INFORMATION
- NEW PUBLICATION BOOK/MAGAZINE
- LIFE DESIGN
- TOUR GUIDE
- FOODS/LIQUORS
- PERSONAL GROOMING
- NEW PRODUCT INFORMATION
- BEAUTY · HEALTH

- CONCERT/EVENT
- LIFE INFORMATION

RETURN

EXAMPLE OF ADVERTISEMENT KIND LIST PICTURE PLANE

INFORMATION DISPLAY METHOD

BACKGROUND OF THE INVENTION

1. Field of the Invention

The invention relates to an information display method suitable for use in case of electronically transmitting, for example, data of a published document such as newspaper, magazine, book, or the like, data of an advertisement, or the like.

2. Description of the Related Art

As a method of providing news, newspapers and television are most spread at present. There is a drawback such that the news of the newspaper is not always a latest news. There is also a drawback such that the news of the television is not always broadcasted at a time when the user wants to see. In case of the news of the television, there is, further, a drawback such that even if there is only one news which the user wants to see, the user cannot watch the desired news unless he continuously watches an uninteresting news until the desired news comes.

In a situation such that the number of persons in which a time schedule is irregular and the time which can be freely used is short increases, there occurs a necessity such that the user wants to listen to an easy explanation of only the latest news that is interesting for each user for a predetermined short time such as five or ten minutes at his necessary time even in a period of time such as midnight or early morning when the broadcasting time of the television is over.

In consideration of the above situation, as a data broadcasting system for electronically transmitting data (newspaper data) such as a newspaper or the like, the same applicant as the present invention has already filed a system in which newspaper data is inserted to a data channel of a satellite and is transmitted through the satellite as, for example, Japanese Patent Application No. 5-116480.

In the system, in a data receiving apparatus at, for instance, each home (contractor side) who contracted with the reception of the newspaper data, a signal from a satellite is received and the newspaper data inserted to a data channel is extracted. The newspaper data is recorded to a recording medium such as magnetic disk, magnetooptical disk, or the like and a desired news is searched from the recorded newspaper data at a desired time of the contractor even at midnight or early morning. The searched newspaper data is displayed on, for example, a display or the like or is printed out, so that the contractor can watch the newspaper.

In the above data receiving apparatus which has already been filed, however, it is desired for each user to spontaneously search and read an article which the user is interested in, and there is not a function such that only an important article is read in a short time by a feeling like a news of a television.

OBJECTS AND SUMMARY OF THE INVENTION

The present invention is made in consideration of such a situation and enables a main article to be easily watched in a short time.

According to an information display method disclosed in claim 1, there is provided an information display method whereby predetermined information is transmitted through a transmission path, the transmitted information is received by a receiving apparatus, the information received by the receiving apparatus is recorded to a recording medium, and the information recorded to the recording medium is displayed to a display apparatus, wherein titles of a plurality of information are displayed, only a predetermined number of predetermined ones of the titles are designated, and the designated information is automatically and sequentially displayed.

The information is annexed with a genre and the information can be designated every genre.

In a state in which the designated information is automatically and sequentially reproduced, when a display of the previous or subsequent information is instructed, the information before or after the information that is being displayed is displayed and, after that, it is possible to return to a state in which the designated information is automatically and sequentially displayed.

In a state in which the designated information is automatically and sequentially reproduced, when a display of more detailed information is instructed, the more detailed information of the information that is being displayed is displayed and, after that, it is possible to return to a state in which the designated information is automatically and sequentially displayed.

In a state in which the designated information is automatically and sequentially displayed, when a display of titles of the information is instructed, the titles of the information are displayed and, in a displaying state of the titles of the information, when predetermined information is individually designated, the designated information is displayed and, after that, it is possible to return to a state in which the designated information is automatically and sequentially reproduced.

In a state in which the designated information is automatically and sequentially reproduced, when a display of titles of the information is instructed, the titles of the information are displayed and in a displaying state of the titles of the information, when a genre to which the information belongs is designated, the title of the designated genre is displayed and in a displaying state of the title of the designated information, when predetermined information is individually designated, the designated information is displayed and, after that, it is possible to return to a state in which the designated information is automatically and sequentially reproduced.

According to an information display method disclosed in claim 7, there is provided an information display method whereby predetermined information is transmitted through a transmission path, the transmitted information is received by a receiving apparatus, the information received by the receiving apparatus is recorded to a recording medium, and the information recorded to the recording medium is displayed to a display apparatus, wherein the information is annexed with a significance degree and when a predetermined mode is instructed, the information is automatically and sequentially reproduced in accordance with the order corresponding to the significance degrees and, in a state in which the information is automatically and sequentially reproduced in accordance with the order corresponding to the significance degrees, when a display of more detailed information is instructed, the more detailed information of the information that is being displayed is displayed.

In a state in which the information is automatically and sequentially reproduced in accordance with the order corresponding to the significance degrees, when a display of the previous or subsequent information is instructed, the information before or after the information that is being displayed can be displayed.

In a state in which the information is automatically and sequentially displayed in accordance with the order corresponding to the significance degree, when a display of more detailed information is instructed, the more detailed information of the information that is being displayed is displayed and, after that, it is possible to return to a state in which the information is automatically and sequentially displayed in accordance with the order corresponding to the significance degrees.

In a state in which the information is automatically and sequentially reproduced in accordance with the order corresponding to significance degrees, when a display of titles of the information is instructed, the titles of the information are displayed and in a displaying state of the titles of the information, when predetermined information is individually designated, the designated information is displayed and, after that, it is possible to return to a state in which the information is automatically and sequentially reproduced in accordance with the order corresponding to the significance degrees.

In a state in which the information is automatically and sequentially reproduced in accordance with the order corresponding to significance degrees, when a display of titles of the information is instructed, the titles of the information are displayed and in a displaying state of the titles of the information, when a genre to which the information belongs is designated, the title of the designated genre is displayed and in a displaying state of the title of the information of the designated genre, when predetermined information is individually designated, the designated information is displayed and, after that, it is possible to return to a state in which the information is automatically and sequentially reproduced in accordance with the order corresponding to the significance degrees.

The information can be a news article of a multimedia.

According to the information display method disclosed in claim 1, only a predetermined number of predetermined information are designated from the titles of a plurality of information and the designated information is automatically and sequentially displayed. Therefore, the user can easily and certainly watch only the interesting information.

According to the information display method disclosed in claim 7, a plurality of information is automatically and sequentially reproduced in accordance with the order corresponding to the significance degrees. By inputting a predetermined instruction as necessary, the more detailed information can be watched. The main news or the like, therefore, can be easily and certainly watched. Particularly, the interesting information can be watched in more detail.

The above and other objects and features of the present invention will become apparent from the following detailed description and the appended claims with reference to the accompanying drawings.

BRIEF DESCRIPTION OF THE DRAWINGS

FIG. 1 is a diagram showing an example of a construction of a data broadcasting system to which the present invention is applied;

FIG. 2 is a diagram showing a construction of each article data;

FIG. 3 is a block diagram showing an example of a construction of a transmitting apparatus which a service operating company 3 in FIG. 1 has;

FIG. 4 is a diagram for explaining a format of digital channel data;

FIG. 9 is a diagram showing an example of a display in step S11 in FIG. 8;

FIG. 11 is a diagram showing an example of a display in step S21 in FIGS. 10A to 10C;

FIG. 12 is a diagram showing an example of a display in step S22 in FIGS. 10A to 10C;

FIG. 14 is a diagram showing a construction of advertisement data;

FIG. 16 is a diagram showing an example of an advertisement picture plane of vacant seat information;

FIG. 17 is a diagram showing an example of an advertisement index picture plane; and FIG. 18 is a diagram showing an example of an advertisement index picture plane per kind.

DETAILED DESCRIPTION OF THE PREFERRED EMBODIMENTS

Figure 5:
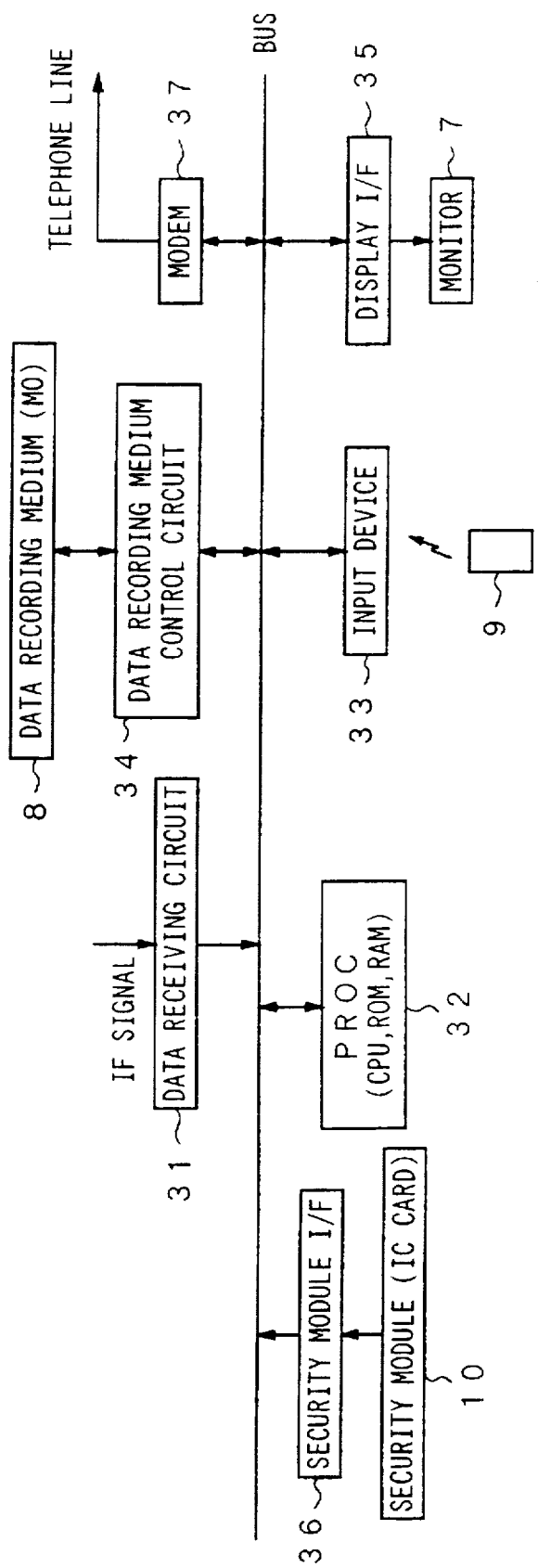
FIG. 5 is a block diagram showing an example of a construction of a data receiving apparatus 6 in FIG. 1.

FIG. 1 shows an example of a construction of a data broadcasting system to which the present invention is applied. According to the data broadcasting system, for example, multimedia data mainly including text data is broadcasted and, on the reception side, the multimedia data is received and recorded to a recording medium and the data can be read out and listened as necessary.

A newspaper publishing company as an information presenter has a large computer 1 in which articles are collected from the whole country and are stored. Predetermined data is transferred to an editing apparatus (computer) 2 in order to form a latest hot news article from the data collected to the large computer 1. The editing apparatus 2 forms a summary article of about 50 to 100 characters from the text data. Subsequently, motion image data as data in which a title and a relative photograph were digitized and compressed is added. Further, the summary article is read by an announcer and data as digital data of his voice corresponding to the summary article and data to designate a layout of a display picture plane of the article and a picture plane design are given.

FIG. 2 shows a format of article data information of a multimedia which was edited. The diagram shows an example in which one kind of photograph and one kind of motion image are added to the article. As shown in the diagram, one article data is constructed by: an article ID that is peculiar to each article; a kind (genre) of article; transmission date and hour when the article was sent from an information presenter; a significance degree (PI) of the article; a title of the article; the number of characters of the summary article (the number of characters of a text); a summary article (summary text); a photograph ID and its size; position information of the photograph on a picture plane; a pointer to photograph data; an motion image ID and its size; position information on the picture plane to display an motion image; a pointer to the motion image data; a pointer to audio read data of the text; and a pointer to detailed article data. The pointer to the detailed article data is a pointer to the detailed article data to refer to a detailed article (main body of the article) when the user reads the summary article and wants to read a further detailed article.

As mentioned above, the multimedia newspaper article data mainly comprising the newspaper data which was edited by the editing apparatus 2 to a form which can be easily watched on the reception side is transmitted to a service operating company 3 through, for example, a data line on the ground. Further, for example, data of magazines and books and the like which are provided by publishing companies as other information presenters, programs (constructed by a video signal and an audio signal) which are provided by television broadcasting stations, and the like are also supplied to the service operating company 3.

For example, in a manner similar to the data which is provided by the newspaper publishing company mentioned above, the data of the magazines and books which is provided by the publishing companies can be also constructed as multimedia data (hereinafter, properly referred to as multimedia magazine/book data) in which text data, image data, and audio data are combined.

The data transmitted to the service operating company 3 is transmitted therefrom to a satellite [broadcasting satellite (BS) or communicating satellite (CS)] 4 and is, further, transmitted from the satellite 4 to the reception side [for instance, a receiver (contractor) at each home, or the like]. Namely, the information (data) which is provided by the information presenter is transmitted through the satellite line to the receiver side.

The service-operating company 3 has, for example, a transmitting apparatus as shown in FIG. 3. The multimedia newspaper data from the newspaper publishing company and the multimedia magazine/book data from the publishing company are multiplexed by a multiplexing circuit (not shown) and are supplied as multimedia data to an encoder 25. In the service operating company 3, for example, the multimedia magazine/book data is edited to a form which can be easily searched on the reception side as necessary and, after that, it is multiplexed to the multimedia newspaper article data.

In addition to the multimedia data, for example, common information including, a data identifier (to identify the multimedia data) or the like, individual information including user management information or the like, and data such as scramble key, work key, and the like are inputted to the encoder 25. Among them, the multimedia data is supplied to a data scrambler 14 and is scrambled in correspondence to a pseudo random sequence which is generated from a PN (pseudo noise) generator 13 and is outputted to an independent data channel multiplexing circuit 12. The pseudo random sequence which is generated from the PN generator 13 is set in correspondence to a scramble key which is inputted there. The scramble key can be periodically changed for example, everyday, or can be irregularly changed.

The scramble key is supplied to not only the PN generator 13 but also a relative information enciphering circuit 11. In addition to the scramble key, individual information, common information, and a work key are supplied to the enciphering circuit 11. The enciphering circuit 11 enciphers the scramble key, individual information, and common information by using the work key. The enciphered data is supplied as relative information to the independent data channel multiplexing circuit 12.

The independent data channel multiplexing circuit 12 multiplexes the scrambled multimedia data which is supplied from the data scrambler 14 and the relative information which is supplied from the enciphering circuit 11 and outputs the resultant data to a digital channel signal multiplexing circuit 15.

The above construction constructs the encoder 25 to form data in an independent data channel, which will be explained with reference to FIG. 4.

An audio signal (at least a part of which is an audio signal of the program provided from the television station mentioned above) which is transmitted as a digital channel signal is also inputted to the digital channel signal multiplexing circuit 15. The digital channel signal multiplexing circuit 15 multiplexes the inputted audio signal (digital audio signal) and the data which is supplied from the encoder 25 and supplies the resultant data to a 4-phase DPSK modulator 16.

The 4-phase DPSK modulator 16 4-phase DPSK modulates the inputted data and outputs the resultant data to a video signal/digital channel signal multiplexing circuit 17. The video signal of the program provided from the television station is also inputted to the video signal/digital channel signal multiplexing circuit 17. Although the audio signal which is inputted to the digital channel signal multiplexing circuit 15 is a digital signal, the video signal which is inputted to the video signal/digital channel signal multiplexing circuit 17 is an analog signal.

In future, the video signal can be set to a digital signal instead of an analog signal and all of data which is transmitted from the information presenters (newspaper publishing company, publishing company, and television station in FIG. 1) can be handled as multimedia data.

It is also possible to scramble the video signal and, thereafter, to input the scrambled video signal to the video signal/digital channel signal multiplexing circuit 17. In this case, the scramble key used for scrambling the video signal is inputted to, for example, the relative information enciphering circuit 11, by which it is enciphered and included in the relative information.

The video signal/digital channel signal multiplexing circuit 17 frequency multiplexes the input video signal and the signal which is supplied from the 4-phase DPSK modulator 16 and outputs the resultant signal to a frequency modulator 18. The frequency modulator 18 frequency modulates a predetermined carrier by the inputted signal and outputs the result to an up-converter 19. The up-converter 19 frequency converts the inputted FM signal to a signal of a frequency band (for instance, Ku band or Ka band) on the order of a gigaherts. The FM signal outputted from the up-converter 19 is power amplified by a power amplifier 20. After that, it is supplied to a transmitting antenna 21 and is transmitted therefrom to the satellite 4 (FIG. 1).

FIG. 4 shows a format (format in the A mode) of the digital channel data which was 4-phase DPSK modulated. As shown in the diagram, data of one frame is constructed by data of total 2048 bits comprising 64 bits in the lateral direction and 32 bits in the vertical direction. A frame sync signal, a control signal, and a range bit signal are arranged (recorded) in a range of first (2 bits×32 bits). Since the data of one frame is transmitted for a time of 1 msec, a transmission rate is equal to 2.048 Mbps.

The frame sync signal is a signal to obtain a synchronization of each frame. The control signal is used to show whether a transmitting mode is the A mode or the B mode, whether a television audio signal (audio signal of the program provided from the television station; arranged in audio regions 1 and 2 or audio regions 3 and 4 in FIG. 4) is a stereophonic signal or a monaural signal of one channel or a monaural signal of two channels, and the like.

In the audio data which was quantized by 14 bits, upper ten bits of the effective digit number are selected and arranged in the audio regions 1 to 4, which will be explained hereinbelow. The range bit signal indicates a range of the selected audio data.

As shown in FIG. 4, the audio data in the audio regions 1 to 4 is respectively recorded (arranged) in the next range of (10×32) bits of the first range of (2×32) bits and in three ranges of (10×32) bits subsequent to the above range of (10×32) bits. (However, there is also a case where data other than audio is arranged in the audio regions 3 and 4.) After the data in the audio region 4, data of an independent data channel is arranged in a range of (15×32) bits. Further, an error correction code in the lateral direction is arranged in the last range of (7×32) bits.

The data of the independent data channel shown in FIG. 4 is transmitted on a predetermined packet unit basis. For example, one packet is constructed by 288 bits and the head 16 bits are used as a header. Substantial data is arranged in subsequent 190 bits. An error correction code of a packet is arranged in the last 82 bits. The header includes at least a service ID code and its error correction code (check bit). The service ID code includes a code for identifying, for example, that the data arranged in such a packet is which one of the relative information and the multimedia data, and the like.

The relative information which is outputted from the relative information enciphering circuit 11 shown in FIG. 3 and the multimedia data which is outputted from the data scrambler 14 are allocated to the independent data channel on a packet unit basis. A service ID code is set in correspondence to the allocated data (indicating whether the data is the relative information or the multimedia data) of the packet.

The above data is transmitted from the service operating company 3 in FIG. 1 to the satellite 4 and is further transmitted therefrom to, for example, the receiver (contractor) at each home. At each home (reception side), the signal transmitted from the satellite 4 is received by an outdoor apparatus (parabolic antenna) 5 and is converted to a predetermined intermediate frequency signal (IF signal). The IF signal is inputted to a data receiving apparatus 6.

The IF signal is demodulated in the data receiving apparatus 6 and contracted data (multimedia data) is extracted from the demodulated signal. The data is recorded to a recording medium or the like (or other magnetic disk or the like, for instance) which is constructed by, for example, a magnetooptic disk (hereinafter, referred to as an MO) 8 or the like and which is detachable to/from a slot for the recording medium of the data receiving apparatus 6.

After the data was recorded to the MO 8, the user (receiver) can search necessary data from the MO 8 at a desired time and can output the searched data. That is, the searched data can be displayed to a monitor 7 comprising a television receiver, a computer display, etc. or can be generated from a speaker (not shown).

The MO 8 can be also attached to, for instance, a portable terminal (not shown), a desk-top type terminal (not shown), or the like and desired data can be searched and displayed (outputted) at an arbitrary location.

FIG. 5 shows an example of a construction of the data receiving apparatus 6. Each block constructing the data receiving apparatus 6 transmits and receives data (including a command for a control and the like) through a bus. Each block is controlled by a processing circuit 32 comprising a CPU, an ROM, and an RAM. The data receiving apparatus 6 can be controlled by operating a remote controller 9. Namely, by operating the remote controller 9, a signal corresponding to the operation is received by the processing circuit 32 through an input apparatus 33. The process corresponding to the signal from the remote controller 9 is executed in the processing circuit 32.

In the data receiving apparatus 6, the IF signal from the outdoor apparatus 5 is supplied to a data receiving circuit 31. The inputted IF signal is demodulated in the data receiving circuit 31. Further, the data receiving circuit 31 decodes the multimedia data which the receiver contracted (for example, the summary article data of a predetermined newspaper publishing company and its associated text data, image data, and audio data; the data of a predetermined magazine or book and its associated text data, image data, and audio data; or the like) under control of the processing circuit 32 and outputs the decoded data to a data recording medium control circuit 34. The data recording medium control circuit 34 records the data from the data receiving circuit 31 to the MO 8.

After that, when the remote controller 9 is operated and an operation signal corresponding to the operation is received by the input apparatus 33, the input apparatus 33 transfers the operation signal to the processing circuit 32. When a predetermined operation signal is received, the processing circuit 32 allows the data recording medium control circuit 34 to reproduce the data recorded on the MO 8 and supplies to a display interface 35. The display interface 35 converts the inputted data to a video signal and outputs to the monitor 7, thereby displaying [in the case where the data reproduced from the MO 8 is audio data, the audio data is generated from the speaker (not shown)]. Thus, the contractor can watch and listen to the contacted newspaper, magazine, or book and, further, its associated text, image, and audio sound.

The data receiving circuit 31 decodes (descrambles) the data and relative information as will be explained hereinlater by using data which is supplied through a security module interface 36 from, for example, an IC card 10 or the like (other memory card or the like) as a security module which is sent from the service operating company 3 (for example, which is sent by making a reception contact).

Figure 6:
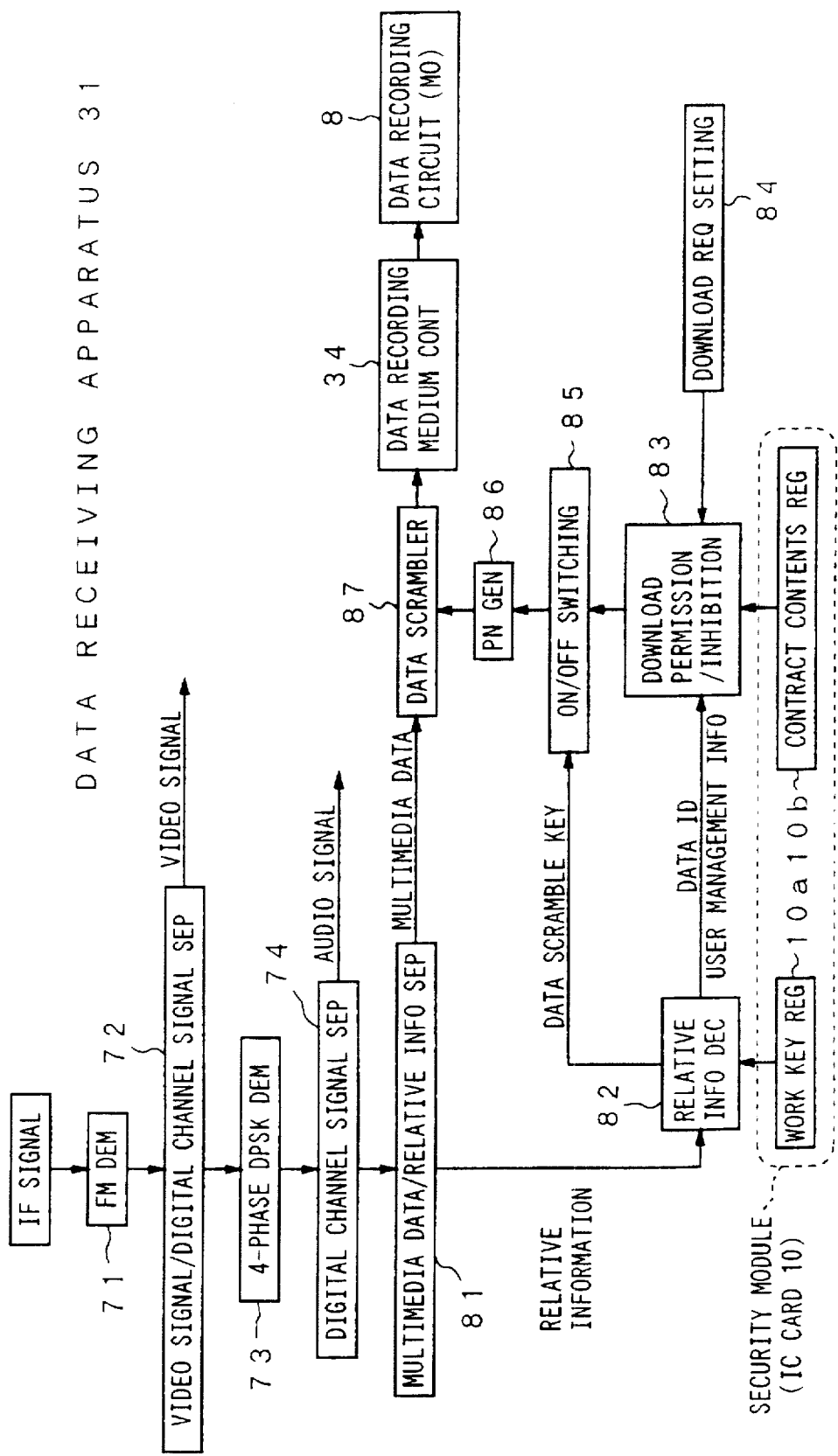
FIG. 6 is a block diagram showing an example of a construction of a data receiving circuit 31 in FIG. 5.

As shown in FIG. 6, which will be explained hereinlater, the IC card 10 is constructed by a work key register 10a and a contract contents register 10b. For example, a work key (the same as the work key which is inputted to the enciphering circuit 11 in FIG. 3) for performing a security management has been stored in the work key register 10a. The contents of the contract which the receiver made with the service operating company have been stored in the contract contents register 10b. The security module interface 36 reads out the information stored in the IC card 10 and outputs the work key and contract contents which are consequently obtained to the data receiving circuit 31.

A modem 37 is connected to a telephone line and executes a predetermined communicating process. Namely, in accordance with an instruction of the processing circuit 32, for example, the modem 37 originating-calls a predetermined telephone number and, further, executes a communication control such as call setting and the like. Moreover, the modem 37 modulates the data which is supplied from the processing circuit 32 and outputs the modulated data to the telephone line. The modem 37 also demodulates the signal which is inputted through the telephone line and supplies the demodulated signal to the processing circuit 32.

FIG. 6 shows a more detailed constructional example of the data receiving circuit 31. The IF signal inputted from the outdoor apparatus 5 is supplied to a frequency demodulator 71. The frequency demodulator 71 demodulates the IF signal to a base band 22 signal and outputs to a video signal/digital channel signal separating circuit 72. The video signal/digital channel signal separating circuit 72 separates the video signal and the digital channel signal from the inputted signal. The video signal is supplied to a decoder (not shown). In the case where the reception contract of the supplied video signal has been made, the decoder descrambles the video signal by using a scramble key (scramble key used when scrambling the video signal) which is supplied from a relative information decoding circuit 82 as will be explained hereinlater. The descrambled video signal is outputted to the monitor 7 through the display interface 35 (FIG. 4) and is displayed in accordance with, for example, the operation of the remote controller 9.

The digital channel signal separated by the video signal/digital channel signal separating circuit 72 is inputted to a 4-phase DPSK demodulator 73 and is demodulated. A signal outputted from the 4-phase DPSK demodulator 73 is inputted to a digital channel signal separating circuit 74, by which it is separated to the audio signal (signals arranged in the audio regions 1 to 4 shown in FIG. 3) and a signal of an independent data channel. In the case where the audio signal corresponds to the foregoing video signal, the audio signal is supplied to the speaker and is generated as audio sound therefrom in accordance with, for example, the operation of the remote controller 9.

The digital channel signal separating circuit 74 outputs the separated independent data channel signal to a multimedia data/relative information separating circuit 81. The multimedia data/relative information separating circuit 81 separates the multimedia data and the relative information from the inputted signal, outputs the multimedia data to a data descrambler 87, and outputs the relative information to the relative information decoding circuit 82. Such a separation is executed by referring to the foregoing service ID code.

The decoding circuit 82 decodes the scramble key, individual information, and common information which were inputted as relative information by using the work key which is supplied from the IC card 10 through the security module interface 36 (FIG. 5). The scramble key is outputted to an on/off switching circuit 85. The data identifier included in the common information and the user management information included in the individual information are outputted to a download permission/inhibition judging circuit 83.

The download permission/inhibition judging circuit 83 compares the inputted data identifier with the contract contents which are supplied from the IC card 10 through the security module interface 36. As mentioned above, the data identifier of the contracted multimedia data has previously been included in the contract contents. So long as inhibition conditions such that the contracted fee is not yet paid and the like are not included in the user management information supplied from the decoding circuit 82, two data identifiers which are inputted to the download permission/inhibition judging circuit 83 coincide, and when the coincident data identifiers have been stored in a download request setting circuit 84, the download permission/inhibition judging circuit 83 generates a control signal to switch the on/off switching circuit 85 to the ON-state. Thus, the scramble key outputted from the decoding circuit 82 is supplied to a PN generator 86 through the on/off switching circuit 85. The data identifier of the data which the receiver desires to download in the multimedia data contracted by the receiver (contractor) has previously been registered in the download request setting circuit 84 by, for example, operating the remote controller 9. Therefore, in the download permission/inhibition judging circuit 83, the control signal is outputted from the download permission/inhibition judging circuit 83 when the data which the receiver desires to download in the contracted multimedia data is received.

The PN generator 86 generates the pseudo random sequence in correspondence to the inputted scramble key. The data descrambler 87 descrambles the multimedia data which is supplied from the multimedia data/relative information separating circuit 81 by using the pseudo random sequence supplied from the PN generator 86 and outputs the descrambled data. The multimedia data outputted from the data descrambler 87 is supplied to the MO 8 through the data recording medium control circuit 34 and is recorded.

In the case where the scramble key used to descramble the video signal from the television station is included in the decoding result of the inputted relative information, the relative information decoding circuit 82 outputs it to the decoder. Thus, the video signal which is outputted from the video signal/digital channel signal separating circuit 72 is descrambled in the decoder as mentioned above by using the scramble key.

After the multimedia data was recorded to the MO 8 as mentioned above, by operating the remote controller 9 as mentioned above, the data can be displayed to the monitor 7 in a desired form of the user or the read voice or the audio sound associated with the motion image can be generated from the speaker.

An example of the operation to read out the data recorded to the MO 8 will now be described. As a mode to read out the data, two modes of an automatic reproducing mode and a guide reproducing mode are provided. In those modes, by previously registering a predetermined genre, only the data belonging to the registered genre is displayed. Therefore, by previously registering the interesting genres of each user, it is possible to prevent that the data regarding the uninteresting genre is displayed in vain.

Figure 7:
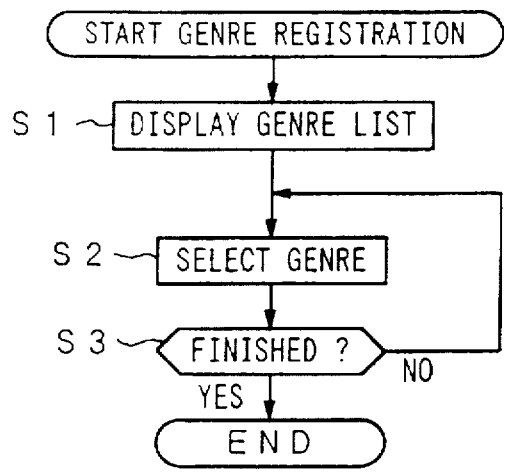
FIG. 7 is a flowchart showing a genre registering process of the data receiving apparatus 6 in FIG. 5.

FIG. 7 shows an example of the genre registering process. When an instruction of the genre registration is inputted to the processing circuit 32 through the input apparatus 33 by operating the remote controller 9, the processing circuit 32 first reads out the genres (kinds shown in the format of FIG. 2) stored in the MO 8 and displays a list of them to the monitor 7 in step S1. In step S2, the user executes the process to select a desired genre while watching the display of the list of genres. Namely, the user designates the desired genre to be displayed from the list of the genres displayed on the monitor 7. The processing circuit 32 stores the designated genre into the built-in ROM.

The above processes are repetitively executed until an instruction to finish the genre registration is inputted in step S3.

In the genre registering process in FIG. 7, the genre in the automatic reproducing mode and the genre in the guide reproducing mode can be independently designated, respectively.

For example, the genres can be set to top, integration, explanation, politics, international, economy, market situation, home, radio, sports, district, society, television, special edition, weather, notice, reading, others, and the like. By previously registering the genres as mentioned above, when the automatic reproducing mode is activated, only the registered genres are automatically reproduced. When the guide reproduction is activated, lists of picture planes of the titles of the registered genres are sequentially displayed. Among them, the user can further select a desired article which he wants to read from among the lists.

As such genres, all of the prepared genres can be also selected. In this case, all of the information which is provided is displayed.

Figure 8:
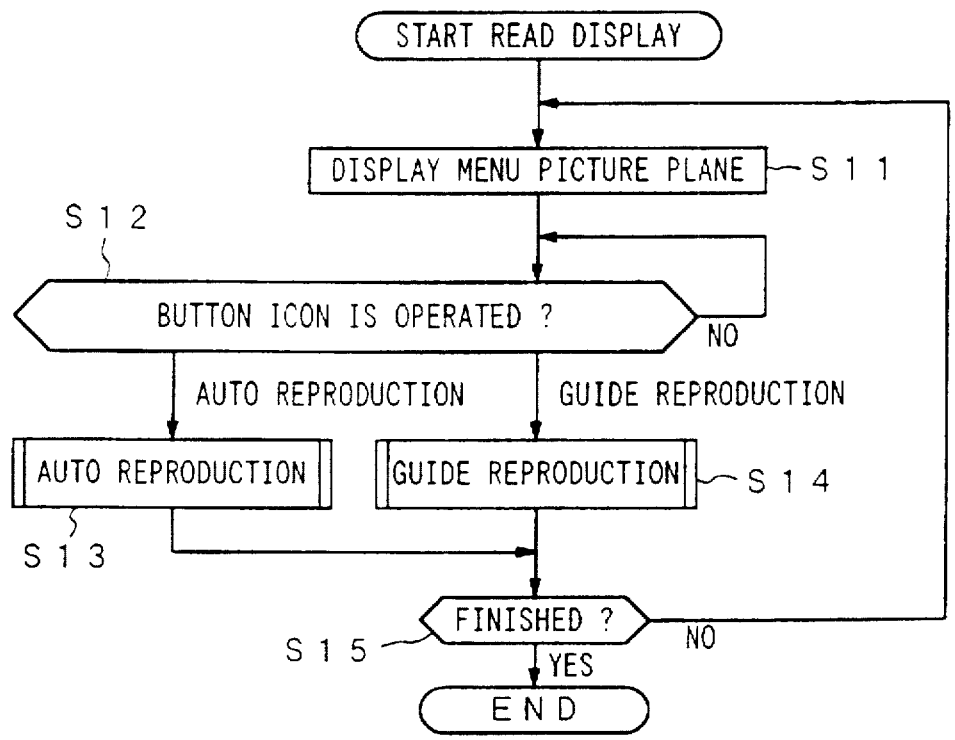
FIG. 8 is a flowchart showing a read displaying process of the data receiving apparatus 6 in FIG. 5.

After the genre registering process was performed as mentioned above, when the reproduction of the information recorded in the MO 8 is instructed, the processing circuit 32 executes processes shown in the flowchart of FIG. 8. Namely, in first step S1, a menu picture plane as shown in, for example, FIG. 9 to select the automatic reproduction and guide reproduction is displayed on the monitor 7. As shown in FIG. 9, a genre designated as "optional course" (automatic reproduction) and a genre designated as "recommended course" (guide reproduction) are displayed in the picture plane. In case of the embodiment, genres of top, sports, politics, and society are designated as "optional course" and genres of top, integration, explanation, politics, international, economy, market situation, home, radio, sports, district, society, television, special edition, weather, notice, reading, and others are designated as "recommended course".

Further, in the embodiment of FIG. 9, 5 minutes or 10 minutes can be selected as a reproducing time of each course. For example, when a time of 5 minutes is selected as "optional course", an editing process is executed by the processing circuit 32 so as to reproduce an article of each of the genres of top, sports, politics, and society in five minutes. When a time of 10 minutes is designated, each of those genres is displayed in ten minutes.

In step S12, therefore, the apparatus waits until any one of button icons displayed on the picture plane shown in FIG. 9 is operated. When the button icon of "optional course" and the button icon of 5 minutes or 10 minutes to designate the reproducing time are selected, the processing routine advances to step S13 and the automatic reproducing process is executed. On the other hand, when a button icon of "recommended course" and a button icon to select the reproducing time of 5 minutes or 10 minutes are selected, the processing routine advances to step S14 and the guide reproduction is executed. The automatic reproduction and the guide reproduction will be described in detail with reference to flowcharts of FIGS. 10 and 13, respectively.

In step S15, a check is subsequently made to watch if the end of the reproducing operation has been instructed or not. If NO, the processing routine is returned to step S11 and the similar processes are repetitively executed. When the end of the reproducing operation is designated, the processing routine is finished.

The automatic reproducing process will now be described in detail with reference to the flowchart of FIGS. 10A to 10C. First in step S21, a title picture plane of the first genre among the genres which have previously been registered is displayed. FIG. 11 shows a display example of the title picture plane. In the embodiment, the title picture plane of the genre of top is shown.

As shown in FIG. 11, button icons of "title", "previous article", and "next article" are displayed on the left side of the display region of the article information of the picture plane (in the display state, however, since the button icons of "previous article" and "next article" cannot be selected, they are not substantially displayed). Button icons of the genres registered as genres to be reproduced (in case of the embodiment, button icons of top, sports, politics, and society) are displayed on the top side in the automatic reproducing mode.

In case of the embodiment, among the button icons of four genres, the button icon of top selected at present is displayed in a deep-set state. Since the display is a display of a title picture plane, the button icon of title is brightly displayed in yellow.

The button icons of the automatic reproduction and guide reproduction are displayed at the right upper positions of the picture plane. In the present situation, since "optional course" (automatic reproducing mode) is selected, except the case where the title picture plane is being displayed or the case where the automatic reproducing state is stopped during the display of the article picture plane, the button icon of the automatic reproduction is, for example, brightly displayed in yellow and the button icon of the guide reproduction is always displayed in gray.

The title of the article of the genre selected at present (in the present case, top) is displayed on the lower side of those button icons. In the embodiment, one article of the genre of society, one article of the genre of economy, two articles of the genre of international, and one article of the genre of politics are displayed as articles of top.

An advertisement region is provided under the display region of the above article information. Advertisement information is displayed in the advertisement area. Button icons of "schedule introduction" and "advertisement index" are displayed in the advertisement region. By selecting the button icon of "schedule introduction", the more detailed schedule or the like of a travel advertisement displayed here can be displayed. By selecting the button icon of "advertisement index", indices of travels and other advertisements are displayed. Among them, a desired advertisement can be further selected.

FIG. 14 shows an example of advertisement data. As shown in the diagram, one advertisement data is constructed by an advertisement ID, a title, a kind of advertisement, an advertisement main company name, a pointer to advertisement region image data, a command name to access to relative information (for example, vacant seat information and advertisement index in FIG. 11, which will be explained hereinlater), layout information of a button for the command, and a pointer to picture plane data of the relative information which is accessed when the command is designated.

In step S21, after the elapse of a predetermined time after the title picture plane was displayed, the processing routine advances to step S22. A picture plane of the first article among the articles displayed in the titles displayed in step S21. In case of the embodiment, an article of [Solibzine, three persons died even in clinical demonstration] displayed on the top of FIG. 11 is displayed. Namely, the summary article (summary text) of the article is displayed and the text is read by a voice.

In step S23, a check is made to see if the voice reading which is now being performed has been finished or not. If NO, step S24 follows and a check is made to see if any one of the button icons displayed on the picture plane has been operated or not. When none of the button icons is operated, the processing routine is returned to step S22 and the subsequent processes are repetitively executed. Namely, the display operation of the article is continued.

In step S23, when it is judged that the voice reading of the article displayed at present has been finished, step S25 follows. A check is made to see if the article displayed at present is the last article of the genre (in the present case, top) or not. When there are some other articles of the genre of top, step S26 follows and the next article of the genre of top is selected. The processing routine is returned to step S22 and this article is displayed. Namely, in case of the embodiment, an article of [Government society of tax administration examination decided report regarding "substantial increase in tax"] is displayed.

When it is judged in step S23 that the reading of the article has been finished, the processing routine is again returned to step S25. A check is made to see if the article is the last article of the genre of top or not. If NO, step S26 follows and an article of [U.S.A. showed draft of decided result about sanctions against North Korea to Japan and south Korea] is selected. This article is displayed in step S22.

For example, when the fourth article is selected in step S26 as mentioned above, an article of [Whole image of atomic development in North Korea is researched] as shown in, for instance, FIG. 12 is displayed in step S22.

As shown in FIG. 12, button icons of guide reproduction, automatic reproduction, title, previous article, and next article are displayed in the article display region of the display picture plane. Further, the button icon of the whole article is also displayed. In the advertisement region, since this advertisement is an advertisement regarding the concert, the button icon to know the vacant information of the concert is displayed together with the button icon to display the advertisement index.

As mentioned above, in step S25, when it is judged that the last article of the genre of top has been displayed, step S27 follows. A check is made to see if the genre selected at present is the last one of the genres registered as targets of the automatic reproduction or not. If NO, step S28 follows and the next genre is selected. In the present case, the genre of sports is selected. The processing routine is returned to step S21 and the title picture plane of the sports is displayed. Further, the processing routine advances to step S22 and the first article of the genre of sports is displayed.

In this manner, the articles of each genre are sequentially automatically displayed.

When it is judged in step S27 that the genre is the last genre (in the case of the embodiment, society) registered as a target of the automatic reproduction, the automatic reproducing process is finished.

In a state in which the individual articles as shown in, for example, FIG. 12 are displayed, when it is judged in step S24 that any one of the button icons has been operated, any one of the processes in steps S29, S30, S31, S34, and S37 is executed in correspondence to the operated button icon.

In step S24, when it is judged that the button icon of the previous article has been selected, step S29 follows and the selecting process of the previous article is executed. Namely, in a state in which an article of, for example, [Whole image of atomic development in North Korea is researched] shown in FIG. 12 is displayed, when the button icon of the previous article is selected, an individual article of [U.S.A. showed draft of decided result about sanctions against North Korea to Japan and South Korea] as one previous article (refer to FIG. 11) is displayed.

On the other hand, when it is judged in step S24 that the button icon of the next article has been operated, step S30 follows and the next article selecting process is executed. For example, in a state in which the article shown in FIG. 12 is displayed, when the button icon of the next article is selected, an article of [Former secretary testified money scandal of ex-Prime Minister Hosokawa] is displayed.

In step S24, when it is judged that the button icon of the whole article has been selected, step S31 follows. The picture plane of the whole article (more detailed article) is read out and the displaying process is executed. In step S32, a check is made to see if the reading of the whole article has been finished or not. The whole article is displayed until the reading of the whole article is finished. When it is judged in step S32 that the reading has been finished, step S33 follows and the next article is selected. The processing routine is returned to step S22 and the article is displayed.

It is also possible to construct in a manner such that a button icon to access to a predetermined data base is prepared in the picture plane of the whole article so that related article and information can be further searched and when this button icon is operated, the data base is directly accessed.

In step S24, when it is judged that the button icon of the automatic reproduction has been selected, step S34 follows and the automatic reproducing state is stopped. The button icon of the automatic reproduction is changed to a display in gray. Thus, the voice reading is also temporarily interrupted and the picture plane is also changed to a still image (pause state).

This state is continued until it is judged that the button icon of the automatic reproduction has been again operated in step S35. When it is judged that the button icon of the automatic reproduction has been again operated, step S36 follows and the button icon of the automatic reproduction is brightly displayed. The processing routine is returned to step S22 and the subsequent processes are repetitively executed.

Namely, in a state in which the individual article is displayed in the automatic reproducing mode, when the button icon of the automatic reproduction is operated, the apparatus is set to so-called a pause state. The pause state is cancelled by again operating the button icon of the automatic reproduction.

In step S24, when it is judged that the button icon of title has been operated, step S37 follows and the title picture plane of the genre to which the individual article displayed at present belongs is again displayed. That is, the same title picture plane (title picture plane of FIG. 11) as the title picture plane displayed in step S21 is again displayed.

The apparatus waits until it is judged in step S38 that any one of the button icons displayed on the title picture plane has been operated. When it is judged that the button icon to select any one of the genres has been selected, step S40 follows and the process to select the designated genre is executed. The processing routine is returned to step S37 and the title picture plane of the designated genre is displayed. For example, in a state in which the title picture plane of the genre of top shown in FIG. 11 is displayed, when the button icon of sports is selected, the title picture plane of sports is displayed.

When it is judged in step S38 that the button icon corresponding to the article displayed on the title picture plane of the genre displayed at present has been selected, step S39 follows and the process to select the designated individual article is executed. The processing routine is returned to step S22 and the picture plane of the selected article is displayed.

It will be obviously understood that not only the summary article but also a photograph, a motion image, a drawing, and the like added in accordance with the article are displayed when displaying each article.

The reproducing order in the case where the automatic reproducing mode is designated is determined on the basis of a significance degree (FIG. 2) associated in correspondence to each information. When the significance degrees are equal, the information transmitted at an early timing is displayed first.

In a state in which each article is automatically and sequentially reproduced as mentioned above, by selecting the previous article or the next article, the previous or next article is displayed and, after that, the apparatus can be again returned to the original automatic reproducing mode. Similarly, even after the details of a predetermined article were displayed, the apparatus can be also automatically returned to the original automatic reproducing state. In the automatic reproducing state, even in the case where the title picture plane is temporarily displayed or a new article is designated or a new genre is designated from this picture plane and a new article of this genre is designated, when the display of the article is finished, the apparatus is again returned to the automatic reproducing mode.

A guide reproducing process shown in step S14 in FIG. 8 will now be described in detail with reference to a flowchart of FIGS. 13A to 13D. First in step S71, the first title picture plane of a predetermined genre is displayed. For example, a genre as shown in FIG. 9 is designated as a genre as a target of the guide reproduction, the title picture plane of the first genre of top is displayed. Namely, in case of the embodiment, the title picture plane as shown in FIG. 11 is displayed.

The processing routine advances to step S72 and the user selects a desired article to be reproduced from the articles displayed. The process to select the desired article is repetitively executed until the end of the selecting operation is judged in step S73. For example, when five articles are displayed as shown in FIG. 11, the desired article to be reproduced is designated from the five articles.

When the designating process is finished, step S74 follows and a check is made to see if the desired article to be reproduced is designated with respect to the other genre or not. When the user also wants to select the article with respect to the other genre, step S75 follows and a new genre is selected and designated. For example, the genre of integration is designated. Thus, the title picture plane of the genre of integration is displayed in step S71. Similarly, the process to select the desired article to be displayed from the title picture plane of the genre of integration is executed.

As mentioned above, after completion of the operations for designating the desired genre and further designating the desired article to be displayed from the designated genre, the processing routine advances from step S74 to step S76. The first article of the genre which was first designated is displayed on the picture plane. In this instance, in a manner similar to the case of the automatic reproduction, the summary article, photograph, motion image, drawing, and the like are displayed and the voice reading is performed. In step S77, a check is made to see if the voice reading has been finished or not. If NO, step S78 follows and a check is made to see if any one of the button icons has been operated or not. When none of the button icons is operated, the processing routine is returned to step S76 and the subsequent processes are repetitively executed. That is, the display of the article is continued.

When it is judged in step S77 that the reading has been finished, step S79 follows and a check is made to see if the article is a desired last article to be displayed or not. If YES, the guide reproducing process is finished. However, when some other articles which are not displayed remain, step S80 follows and the next article is selected. The selected article is read out to the picture plane in step S76 and is displayed.

The articles designated in steps S71 to S75 are sequentially automatically reproduced as mentioned above.

In a state in which the individual articles are displayed, when it is judged in step S78 that any one of the button icons has been operated, any one of the processes in steps S81, S82, S83, S86, and S89 is executed.

Figure 10A:
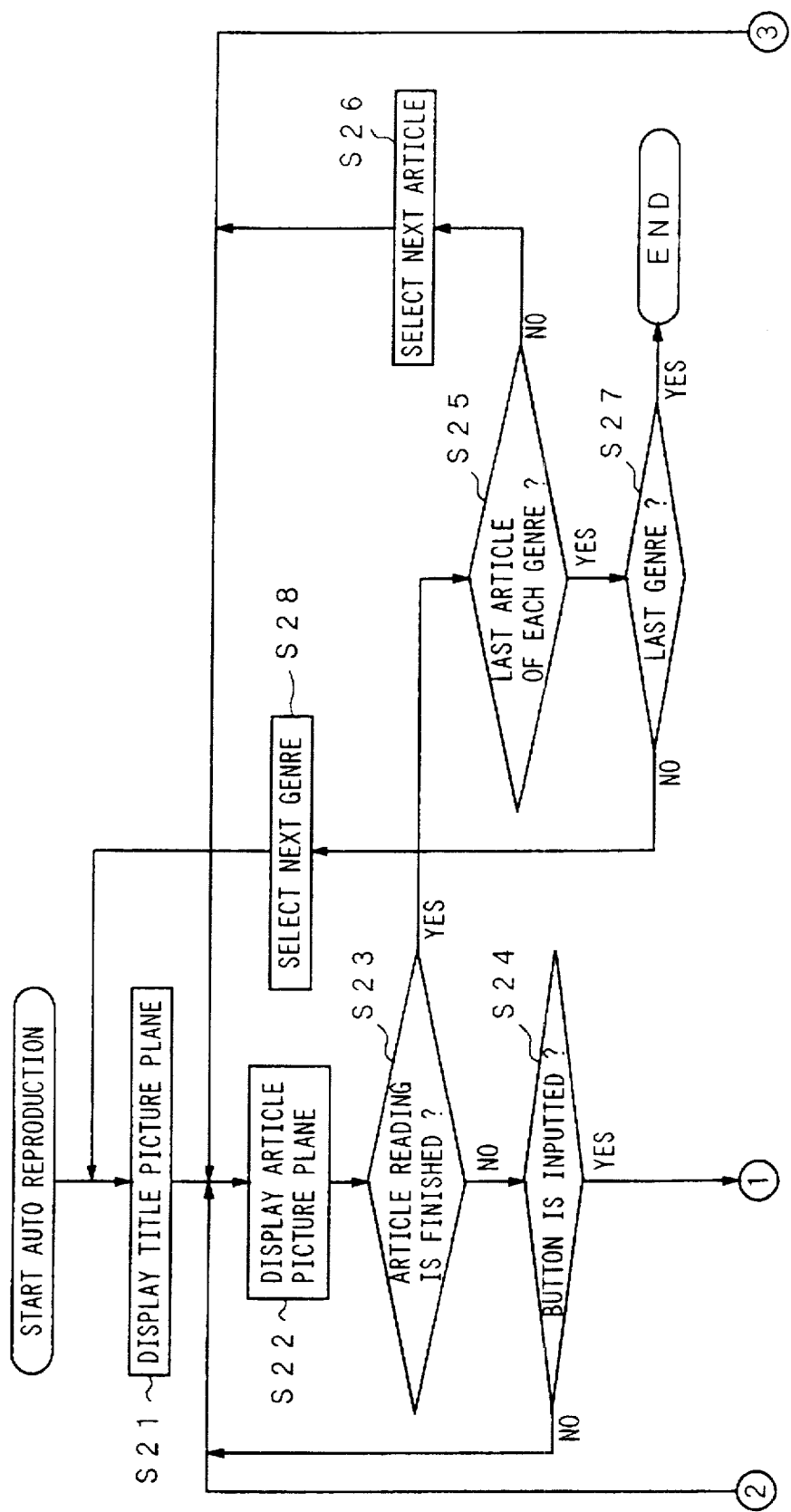
FIGS. 10A to 10C are flowcharts showing an automatic reproducing process in step S13 in FIG. 8.
Figure 10B:
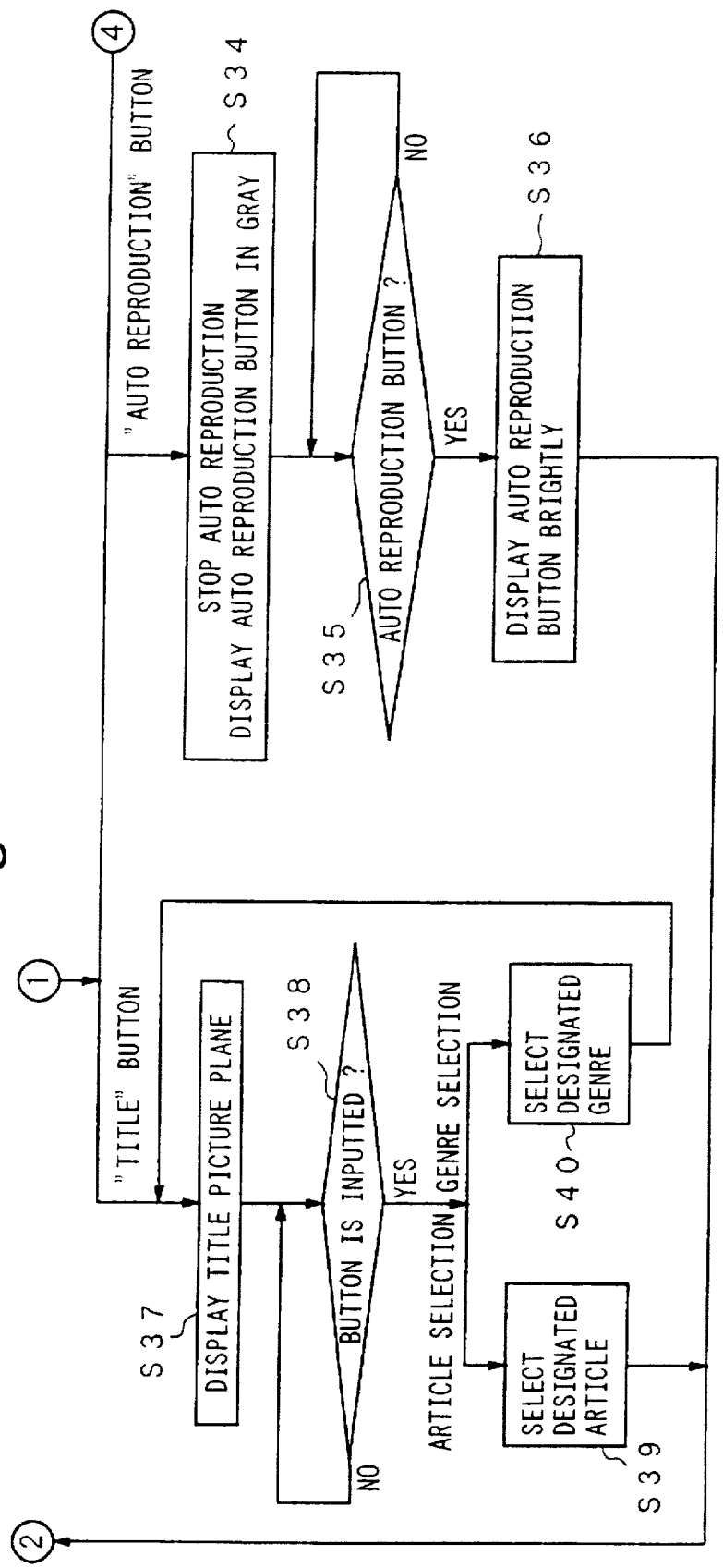
Figure 10C:
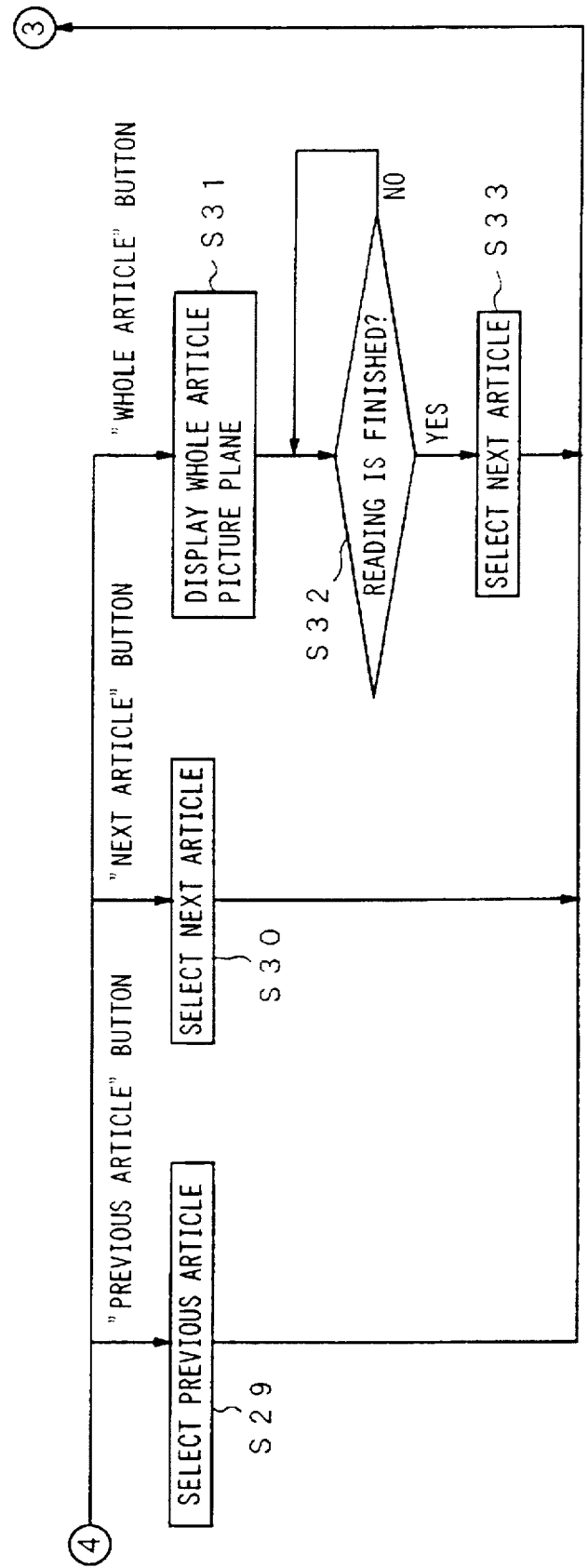
Figure 13A:
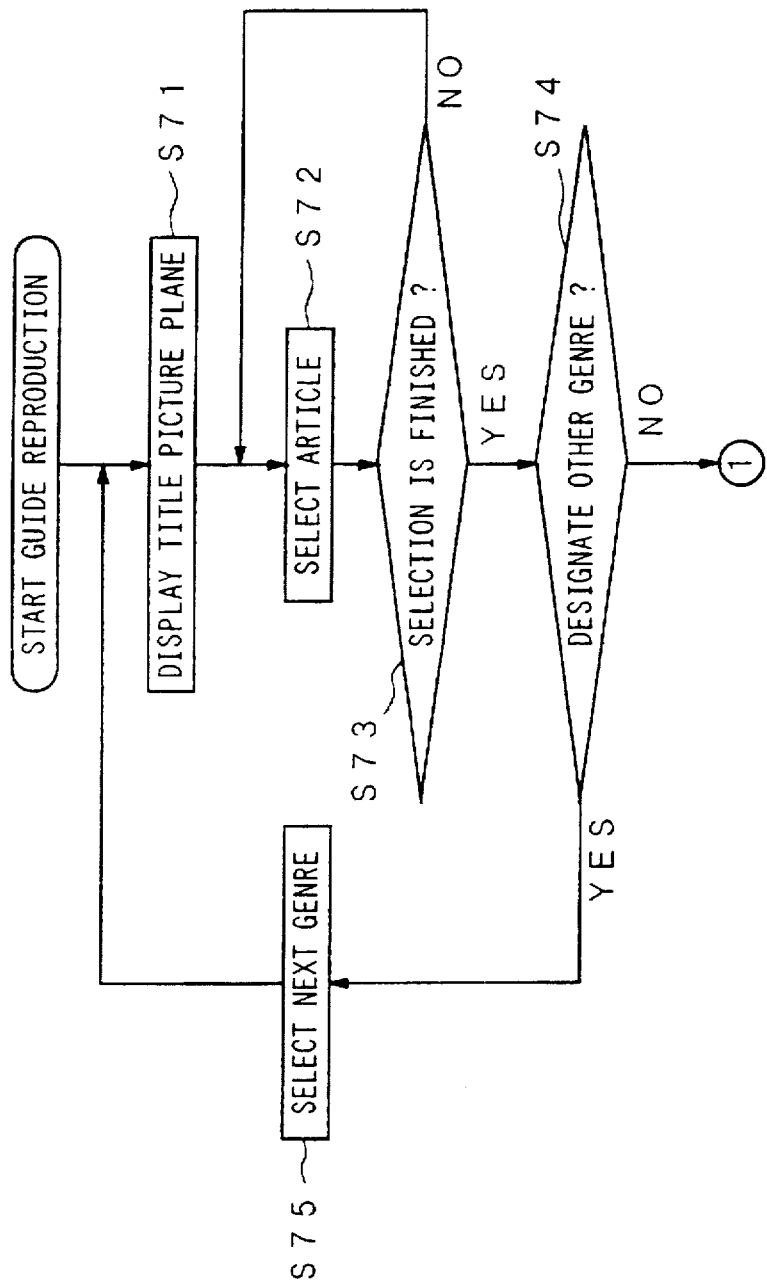
FIGS. 13A to 13D are flowcharts showing a guide reproducing process in step S14 in FIG. 8.
Figure 13B:
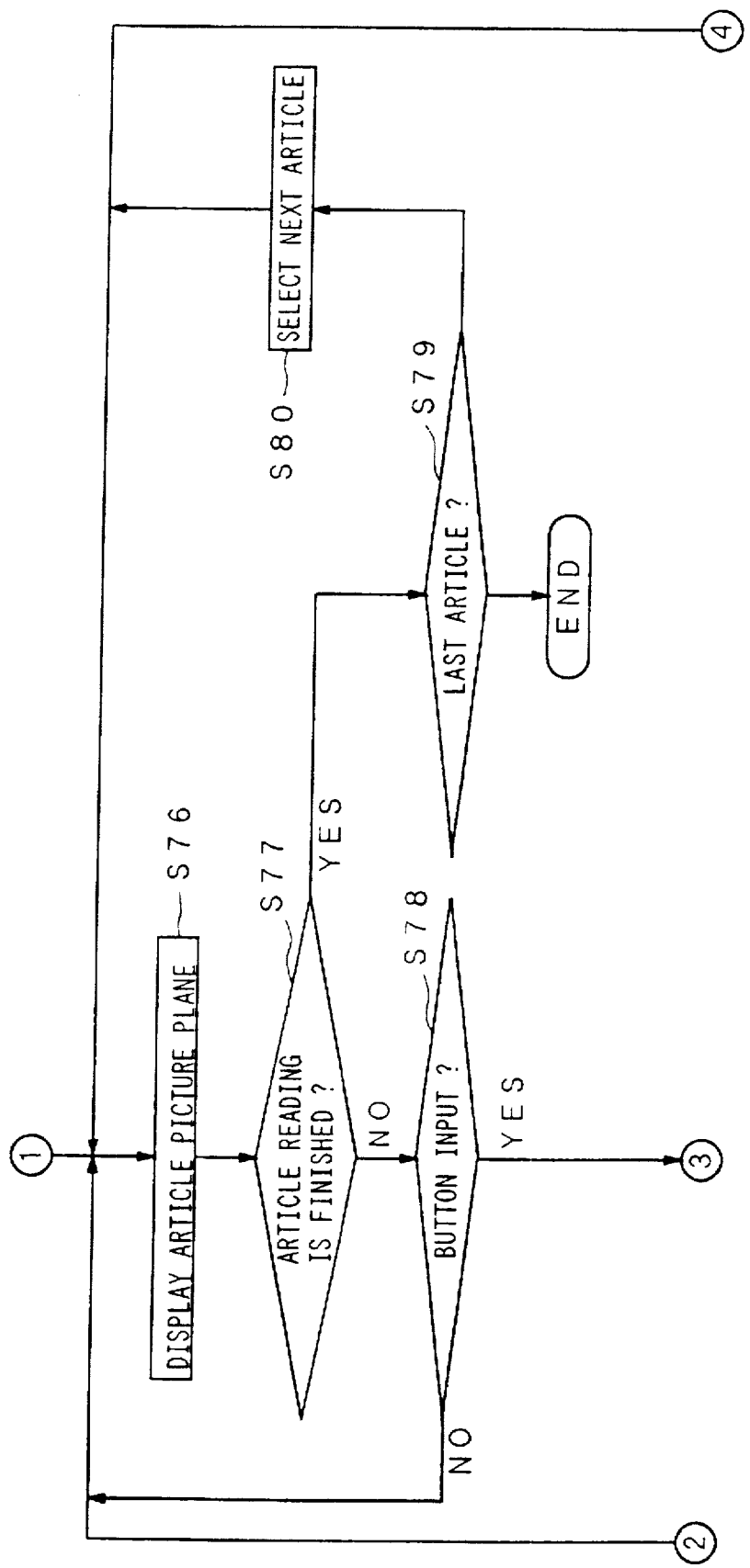
Figure 13C:
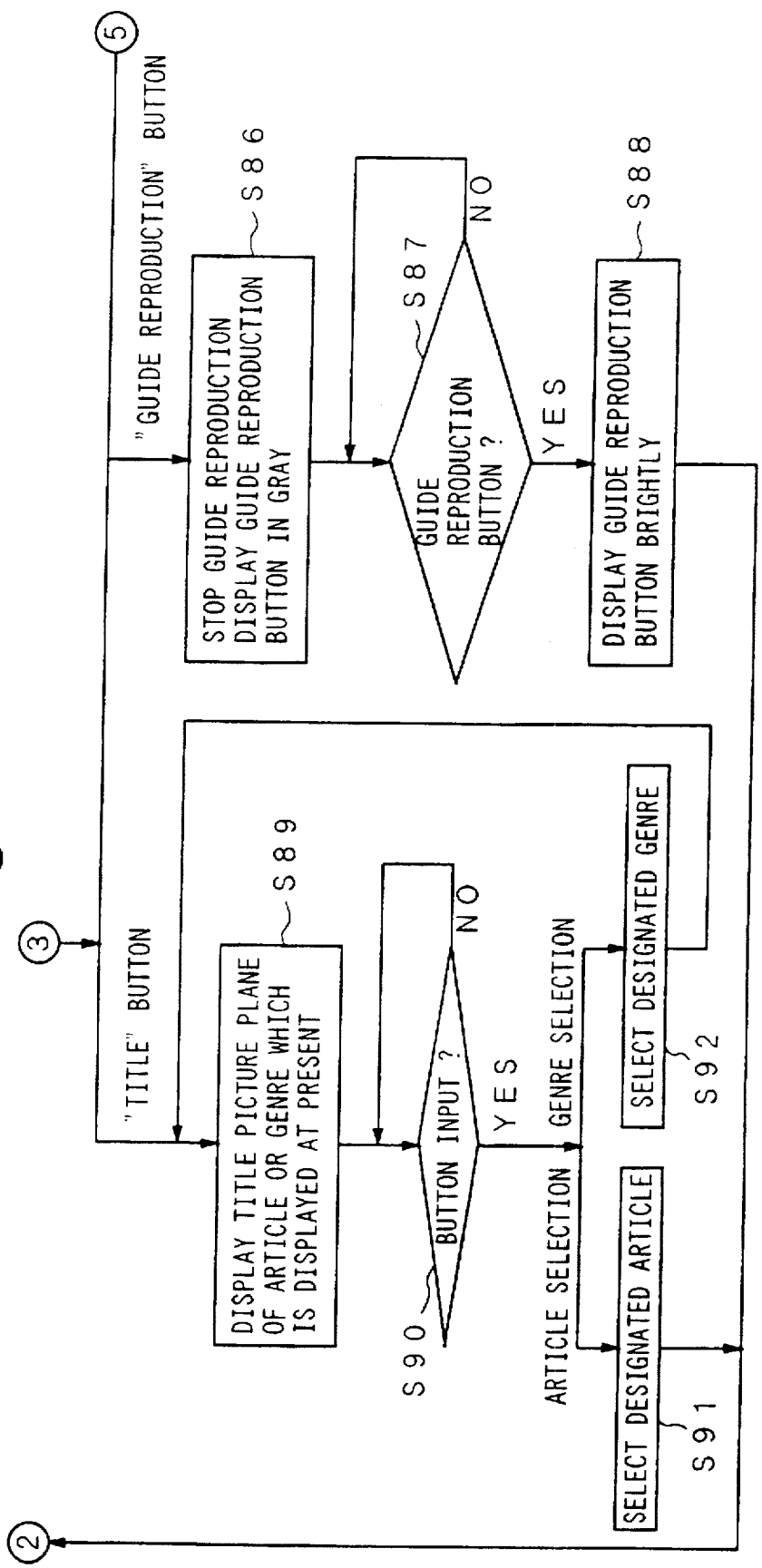
Figure 13D:
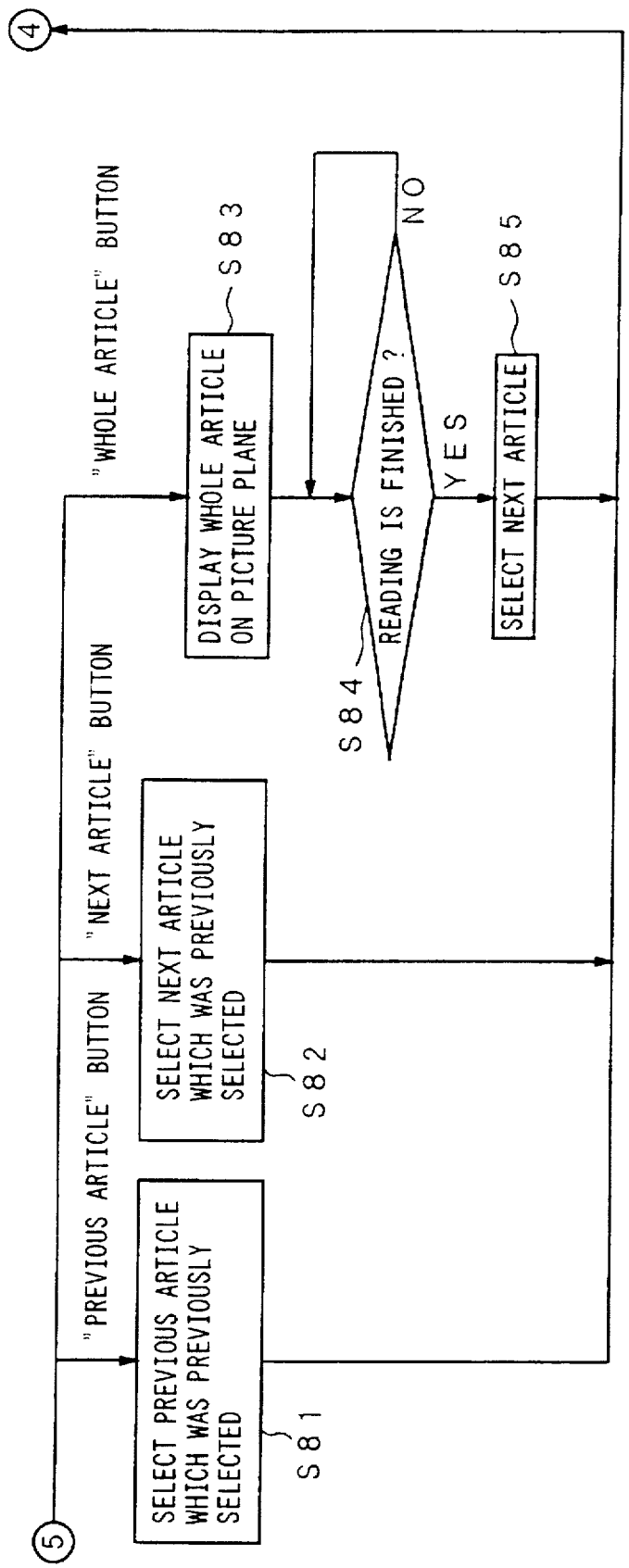

Processes which are executed after step S81 are fundamentally similar to the processes in steps S29 to S40 in the automatic reproducing process in FIGS. 10A to 10C.

Namely, when it is judged in step S78 that the button icon of the previous or next article has been operated, the processing routine advances to step S81 or S82 and the previous or next article is selected. The processing routine is returned to step S76 and the selected article is displayed.

When it is judged that the button icon of the whole article has been selected, step S83 follows and the whole sentence of this article is displayed. In step S84, when it is judged that the reading of the whole article has been finished, the next article is selected in step S85. The processing routine is returned to step S76 and the subsequent processes are repetitively executed.

When it is judged that the button icon of the guide reproduction has been operated, the guide reproduction is temporarily stopped in step S86 and the button icon of the guide reproduction is changed to the gray display state from the bright display state. The apparatus waits until the button icon of the guide reproduction is again operated in step S87. When it is operated, the processing routine advances to step S88 and the button icon of the guide reproduction is again brightly displayed. The processing routine is returned to step S76 and the temporarily stop state is released and the guide reproduction is again started.

When it is judged in step S78 that the button icon of title has been selected, the title picture plane of the genre to which the article displayed at present belongs is read out and is displayed in step S89. A check is made in step S90 to see if any one of the button icons displayed on the title picture plane has been operated or not. When it is judged that the button icon to designate the genre has been operated, step S92 follows and the designated genre is selected. Further, the title picture plane of the designated genre is displayed in step S89.

When it is judged in step S90 that the button icon to select the individual article has been operated, step S91 follows and the designated individual article is selected. This article is displayed in step S76.

In FIG. 12, when the user watches advertisement information shown in FIG. 12 and wants to go to listen to the concert advertised here, the user operates a button icon of "vacant seat information" and can know the present reservation situation. The user watches vacant seat information shown in FIG. 16, confirms vacant seats, calls a telephone number displayed, and applies to purchase a ticket of the vacant seat.

In a state in which the vacant seat information as shown in FIG. 16 (state in which no more detailed advertisement information exists), the apparatus waits until a button icon of "return" is selected in step S59. When it is selected, the processing routine is finished (the processing routine advances to step S22 and is returned to the display state of FIG. 12).

Figure 15:
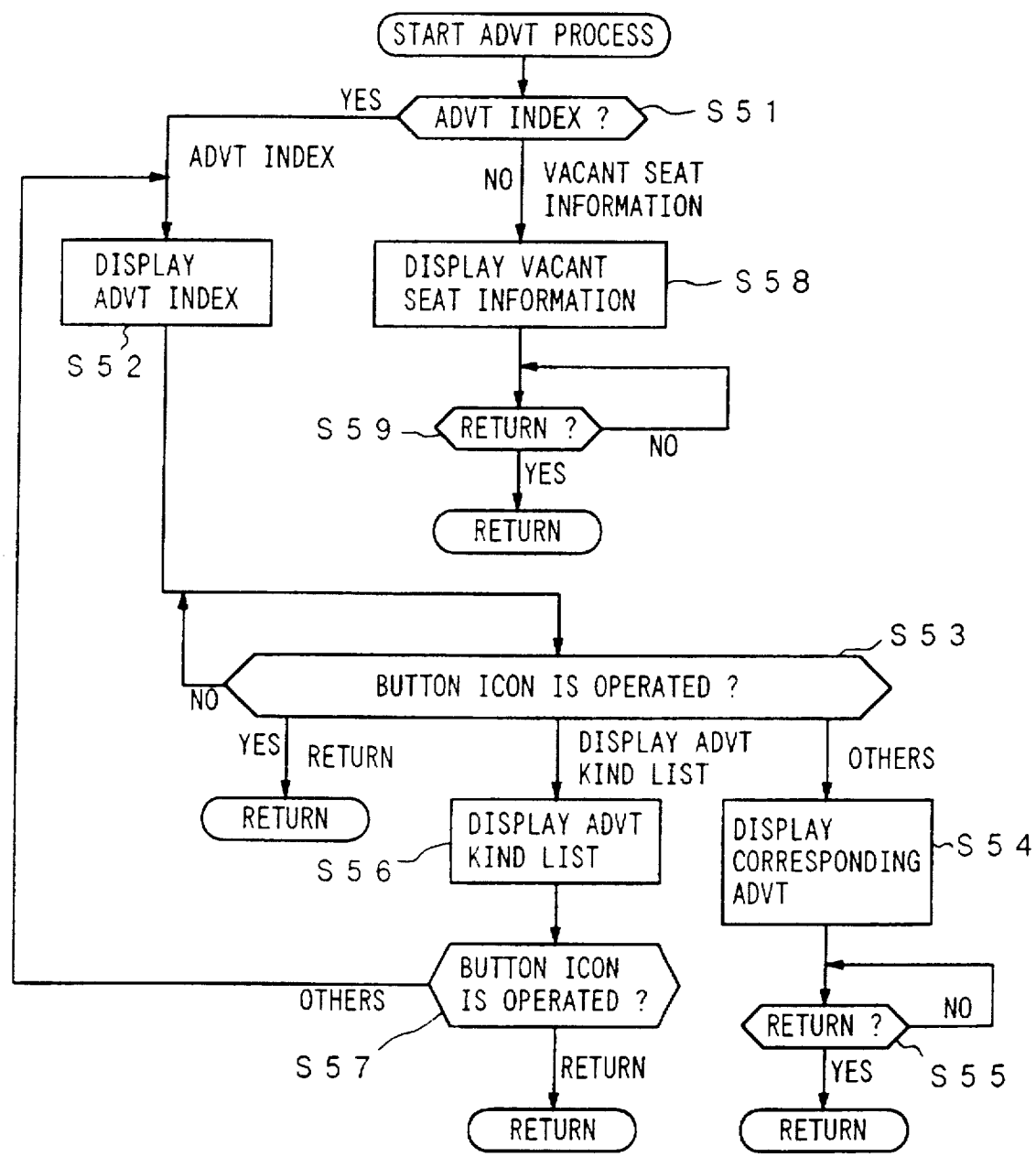
FIG. 15 is a flowchart showing an example of a process in step S41 in FIGS. 10A to 10C.

When it is judged in step S51 that the button icon of "advertisement index" in the advertisement region has been operated as shown in FIG. 15, step S52 follows and, for example, the advertisement index as shown in FIG. 17 is displayed on the picture plane. Since the advertisement information displayed in the advertisement region before the button icon of "advertisement index" is selected is information of "concert", when the button icon of "advertisement index" is selected, the advertisement index of the advertisement information belonging to the same genre, namely, the advertisement index of the concert/event information is displayed.

In a state in which the advertisement index as shown in FIG. 17 is displayed, a check is made to see if the button icon of "return" and a button icon of "advertisement kind list" have been selected or not or a check is made to see if a button icon to select the details of various concerts or events (for instance, button icon of BB Matsuda) has been selected or not.

When it is judged that the button icon of "return" has been selected, the processing routine is finished (the processing routine advances to step S22 and is again returned to the display picture plane as shown in FIG. 12).

When it is judged in step S53 that the button icon of "advertisement kind list" has been selected, step S56 follows and information showing a list of advertisement kinds as shown in FIG. 18, for example, is displayed on the picture plane.

In this state, the button icon of "return" and a button icon to select the details of various advertisements (for example, button icon of "real estate/house information") are displayed. Therefore, in step S57, a check is made to see if any one of those button icons has been operated or not. When it is judged that the button icon of "return" has been selected, the processing routine is finished (the processing routine advances to step S22 and is again returned to the display picture plane as shown in FIG. 12).

On the other hand, when the button icon of "real estate/ house information" or the like is selected, the processing routine is returned to step S52 in which the advertisement index of the kind corresponding to the button icon is displayed on the picture plane.

On the other hand, in a state in which the advertisement index picture plane shown in FIG. 17 is displayed, when it is judged in step S53 that a button icon of "BB Matsuda" or the like has been selected, step S54 follows and an advertisement corresponding to the button icon is read out and displayed. The apparatus waits until the button icon of "return" is operated in step S55. When it is operated, the processing routine is finished.

The kinds of button icons in the above embodiment are not limited to those mentioned above but other various kinds of button icons can be also displayed.

Although the invention has been described above with respect to case of transmitting information through the satellite as an example, the invention can be also applied to the case of transmitting information through a cable or another transmission path.

As mentioned above, according to an information display method disclosed in claim 1, the titles of a plurality of information are displayed and only a predetermined number of predetermined titles among them are designated and the designated information is automatically and sequentially displayed. Therefore, a person who receives can efficiently watch only desired ones of many information.

According to an information display method disclosed in claim 7, a significance degree is annexed to information and the information is sequentially and automatically reproduced in accordance with the order corresponding to the significance degrees, so that proper information among an extremely large number of kinds of information can be efficiently watched in a short time. Since more detailed information can be displayed as necessary, the user can know in more detail the interesting information and only the necessary information that can be efficiently watched in a shorter time.

The present invention is not limited to the foregoing embodiments but many modifications and variations are possible within the spirit and scope of the appended claims of the invention.

What is claimed is:

1. An information display method of transmitting predetermined information through a transmission path, selectively receiving a predetermined segment of said transmitted information in accordance with a predetermined status of a receiving apparatus, recording said predetermined segment of said information received by said receiving apparatus onto a recording medium, and displaying at least a portion of said predetermined segment of said information recorded on said recording medium on a display apparatus, comprising the steps of:

selecting at least one genre from a plurality of genres prior to the receipt of said predetermined segment of said predetermined information, wherein said predetermined segment of information is divided into a plurality of information portions, each of said information portions being associated with at least one of said plurality of genres; and automatically and sequentially displaying said information portions associated with each of said preselected genres.

2. The method according to claim 1, wherein in a state in which said information portions associated with each of said pre-selected genres are automatically and sequentially reproduced, when a display of said previous or subsequent information is instructed, said information before or after said information that is being displayed is displayed and, after that, said state is returned to a state in which said information portions associated with each of said preselected genres are automatically and sequentially displayed.

3. The method according to claim 1, wherein in a state in which said information portions associated with each of said pre-selected genres are automatically and sequentially reproduced, when a display of more detailed information of said information is instructed, said more detailed information of said information that is being displayed is displayed and, after that, the state is returned to a state in which said information portions associated with each of said preselected genres are automatically and sequentially displayed.

4. The method according to claim 1, wherein in a state in which said information portions associated with each of said pre-selected genres are automatically and sequentially reproduced, when a display of titles of said information is instructed, said titles of said information are displayed, and in a state in which said titles of said information are displayed, when predetermined ones of said information are individually designated, said designated information is displayed and, after that, the state is returned to a state in which said information portions associated with each of said pre-selected genres are automatically and sequentially reproduced.

5. The method according to claim 1, wherein said transmitted information is a multimedia news article.

6. An information display method of transmitting predetermined information through a transmission path, selectively receiving a predetermined segment of said transmitted information in accordance with a predetermined status of a receiving apparatus, recording said predetermined segment of said information received by said receiving apparatus onto a recording medium, and displaying at least a portion of said predetermined segment of said information recorded on said recording medium on a display apparatus, comprising the steps of:

pre-selecting at least one genre from a plurality of genres prior to the receipt of said predetermined segment of said predetermined information, wherein said predetermined segment of information is divided into a plurality of information portions, each of said information portions being associated with at least one of said plurality of genres;

allowing each of said information portions to be associated with significance degrees;

automatically and sequentially reproducing said information portions associated with each of said pre-selected genres in accordance with the order corresponding to said significance degrees when a predetermined mode is instructed; and in a state in which said information is automatically and sequentially reproduced in accordance with the order corresponding to said significance degrees, when a display of more detailed information of said information is instructed, displaying said more detailed information of said information that is being displayed.

7. The method according to claim 6, wherein in a state in which said information portions associated with each of said pre-selected genres are automatically and sequentially reproduced in accordance with the order corresponding to said significance degrees, when a display of said previous or subsequent information is instructed, said information before or after said information that is being displayed is displayed.

8. The method according to claim 7, wherein said information before or after said information that is being displayed is displayed, the state is returned to a state in which said information portions associated with each of said pre-selected genres are automatically and selectively displayed in accordance with the order corresponding to said significance degrees.

9. The method according to claim 6, wherein in a state in which said information portions associated with each of said pre-selected genres are automatically and sequentially reproduced in accordance with the order corresponding to said significance degrees, when a display of more detailed information of said information is instructed, said more detailed information of said information that is being displayed is displayed and, after that, the state is returned to a state in which said information portions associated with each of said pre-selected genres are automatically and sequentially displayed in accordance with the order corresponding to said significance degrees.

10. The method according to claim 6 wherein in a state in which said information portions associated with each of said pre-selected genres are automatically and sequentially reproduced in accordance with the order corresponding to said significance degrees, when a display of titles of said information is instructed, said titles of said information are displayed, and in a state in which said titles of said information are displayed, when predetermined ones of said information are individually designated, said designated information is displayed and, after that, the state is returned to a state in which said information portions associated with each of said pre-selected genres are automatically and sequentially reproduced in accordance with the order corresponding to said significance degrees.

11. An information display method of transmitting predetermined presented information from a transmitting apparatus to a transmission path, receiving said presented information transmitted through said transmission path by a receiving apparatus, recording said received presented information onto a predetermined recording medium, reading out said presented information recorded on said recording medium, and displaying said read-out presented information to a display picture plane of a display apparatus, wherein said method comprises the steps of:

transmitting advertisement information together with said presented information, said advertisement information comprising a plurality of advertisement information segments, each of said advertisement information segments being associated with at least one of a plurality of genres;

providing an advertisement region to display said advertisement information in a part of the display picture plane of said display apparatus for displaying said presented information and displaying a first advertisement information into said advertisement region;

displaying button icons regarding the display of said advertisement information in a part of said display picture plane;

when one of said button icons is operated, displaying a second one of said advertisement information segments associated with the same genre as said first displayed advertisement information in said advertisement region onto said display picture plane; and when a second one of said button icons is operated, displaying a list of said advertisement information segments associated with the same genre as said first and second displayed advertisement information segments.

12. The method according to claim 11, wherein said button icons are displayed in said advertisement region.

13. The method according to claim 11, wherein said button icons include a button for displaying an advertisement genre list.

* * * * *